(12) United States Patent
Saunders

(10) Patent No.: US 10,293,731 B2
(45) Date of Patent: *May 21, 2019

(54) PLATFORM SYSTEM FOR VEHICLE INTERIOR

(71) Applicant: Notel Enterprise LLC, Fort Collins, CO (US)

(72) Inventor: Brian Saunders, Fort Collins, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/805,039

(22) Filed: Nov. 6, 2017

(65) Prior Publication Data

US 2018/0244184 A1 Aug. 30, 2018

Related U.S. Application Data

(63) Continuation of application No. 15/423,367, filed on Feb. 2, 2017, now Pat. No. 9,809,140.

(60) Provisional application No. 62/290,354, filed on Feb. 2, 2016.

(51) Int. Cl.
*B60N 3/00* (2006.01)
*A47C 17/80* (2006.01)
*A47C 17/64* (2006.01)

(52) U.S. Cl.
CPC .......... *B60N 3/008* (2013.01); *A47C 17/645* (2013.01); *A47C 17/80* (2013.01)

(58) Field of Classification Search
CPC ........ A47B 31/06; B60N 3/001; B60N 3/008; A47C 17/80; A47C 17/645
See application file for complete search history.

(56) References Cited

U.S. PATENT DOCUMENTS

| | | | |
|---|---|---|---|
| 1,304,966 A | 5/1919 | Haney |
| 1,478,358 A | 12/1923 | Crain |
| 1,480,071 A | 1/1924 | Hrachovina |
| 1,500,872 A | 7/1924 | Horton |
| 1,527,989 A | 3/1925 | Messing |
| 2,533,792 A | 12/1950 | Hall |
| 2,648,072 A | 8/1953 | De Blieux |
| 2,691,783 A | 10/1954 | Macaulay |
| 3,353,194 A | 11/1967 | Matson |
| 3,454,968 A | 7/1969 | Backman |
| 3,524,673 A | 8/1970 | Beeson |

(Continued)

OTHER PUBLICATIONS

"Notel Instruction Manual" 11 pages.
(Continued)

*Primary Examiner* — Eric J Kurilla

(57) ABSTRACT

At least one embodiment of the inventive technology may be a disassemblable platform system in a pickup truck cab, or other vehicle, such as, but not limited to, a SUV or van that (after installation), comprises: a plurality of panels (generally, 40, as installed) relatively positioned to form a flat, raised rigid platform 41 in a pickup truck cab and that is elevated above lower seat cushions, where such panels include two rear panels 1,2 (i.e., in the rear seat area), a driver area panel 3, a passenger area panel 6, and a console area panel 42 between said driver area panel and said passenger area panel. The system further includes horizontal supports 43 that underlie at least some of said panels, such horizontal supports including at least two right-left horizontal support bars 44 (i.e., a horizontal support bar that is installed in a right-left direction defined by the vehicle); and panel-attached horizontal supports 45, each of which is attached to a panel to which it is dedicated.

20 Claims, 22 Drawing Sheets

(56) References Cited

U.S. PATENT DOCUMENTS

| | | | |
|---|---|---|---|
| 3,648,306 | A | 3/1972 | Auerbach |
| 4,221,424 | A | 9/1980 | Eiserman et al. |
| 4,487,451 | A | 12/1984 | Fiorini |
| 4,918,772 | A | 4/1990 | Haile |
| 5,170,521 | A | 12/1992 | Light |
| 5,771,815 | A | 6/1998 | Leftwich |
| 6,263,527 | B1 | 7/2001 | Ross et al. |
| 9,101,203 | B2 | 8/2015 | Ely |
| 9,809,140 | B2 | 11/2017 | Saunders |
| 2015/0173496 | A1 | 6/2015 | Ely |
| 2015/0191148 | A1 | 7/2015 | Chiciu |
| 2017/0217350 | A1 | 8/2017 | Saunders |

OTHER PUBLICATIONS

Car-Dek CD1001 PetDek—A Car Space Pet Place. https://jet.com/product/Car-Dek-CD1001-PetDek-A-Car-Space-Pet-Place/0d0ae7fe94604ba6907b1da3b5198fb1. Accessed Feb. 2, 2017. 2 pages.

U.S. Appl. No. 62/290,354, filed Feb. 2, 2016. First Named Inventor: Saunders.

U.S. Appl. No. 15/423,367, filed Feb. 2, 2017. First Named Inventor: Saunders.

PLATFORM SYSTEM FOR VEHICLE INTERIOR

CROSS-REFERENCE TO RELATED APPLICATIONS

This is a continuation application of U.S. patent application Ser. No. 15/423,367 filed Feb. 2, 2017, and issued as U.S. Pat. No. 9,809,140 on Nov. 7, 2017, said application is a United States non-provisional patent application claiming priority to and the benefit of U.S. Provisional application 62/290,354, filed Feb. 2, 2016, the entire contents of each application are hereby incorporated herein by reference.

BACKGROUND

The present invention is an interior sleeping platform for vehicles, such as pick-up trucks, SUVs, jeeps, or in fact any vehicle. This interior sleeper may be supported by a part of vehicle's seats and/or occupant assist handles, inter alia. The sleeping system may allow perhaps one to two adults or two adults and a small child, or one adult and one big kid to sleep on the top of the platform. This sleeping device can take full advantage of space inside the vehicle. In some embodiments, the height and level of the whole system may be adjusted, perhaps from the inside. It can provide a comfortable sleeping environment to the users.

In recent years, the desire of sleeping inside of vehicles has become more popular, especially for travelers and road warriors. These people may like to sleep in the car when they are exhausted after a long drive. However, many common passenger automobiles may be unable to provide a comfortable place to sleep. Drivers can pull off to the side of the road and possibly sleep on the front seat. However, this can be uncomfortable and thus perhaps only adequate for short durations of sleep. Additionally, there may not be enough room for the average adult to sleep comfortably on the back seats. On the other hand, if the drivers and passengers want to have a good sleep, they might need to spend around $137 (the average price of a hotel room in the US in 2014) on a hotel room for one night of good sleep. For people who are tight on money, such as college students and young couples, $137 for one night of sleep may be problematic. A cheaper motel room may not provide a neat and tidy environment for exhausted people, especially for ladies and little kids. For drivers, a lack of good sleep might bring negative externalities to society, such as putting himself or herself at risk to have an accident and endangering others on the road as well.

There are few sleeping devices or solutions for vehicles in the current market, particularly many which present only types that exploit the exterior environment. For example, setting up a tent on the top of an automobile, or setting up a sleeping system in the bed of a pick-up truck, and connecting with a heavy trailer. However, all of these sleeping devices may be unable to provide users an economical, convenient and comfortable sleeping environment at the same time.

A sleeping device having a tent on the top of a car may be unable to adequately protect users from bad weather, such as snow, rain, and storm, as well as wild animal attacks. Sleeping in the bed of a pickup truck may not provide users enough space to sleep. The sleeping area may take up all the space of the bed area, leaving little room for travelers to put their belongings. Additionally, if met by an emergency situation, such as a wild animal attack, the user may be unable to drive away immediately. Remodifying vehicles can be expensive and time consuming, but the present invention may require no vehicle modifications and can be installed quickly. Travel Trailers and RV's might provide protection and comfortable sleeping space to users but may also incur high costs, burden of ownership, and additional safety risks inherent with any sort of towing.

Rudimentary or labor intensive sleeping apparatuses may be possibly available for automobile interiors. The sleeping environment with these devices may be, if even practical, inferior to that of the present invention, particularly when considering a multi-person situation. For example, within a typical four door automobile, the sleeping room available on back-seat devices may not be enough for a person who is taller than about 5.35 feet (from one door to the other side of the door), without extensive vehicle modification.

Referring to U.S. Pat. No. 4,221,424 Motor Vehicle Sleeper, issued to Martin A. Eiserman in 1980, this invention is a suspendable sleeping apparatus for use in a motor vehicle, having a passenger compartment with doors on opposite sides. The entire sleeping device is hammock-like and suspends between the doors and the seating area within the compartment. The sleeper is made with fabric, such as denim, which is used for supporting the user. The whole sleeping system is mounted for use with the connecting means interposed between the two doors and the body of the vehicle and with the stop members abutting against the outside of the vehicle at the joints between the doors and the vehicle body for supporting the sleeper body in the compartment.

However, this motor vehicle sleeper may not be useful for a common passenger vehicle. First, this sleeping device may be intended for a cab, such as that for a truck. Normally, the height of a cab in a truck is taller than that of a standard passenger vehicle. And the space that a cab provides may also be bigger. Therefore, if this device is utilized in a common passenger automobile, Eiserman's invention might sag too low and the user's body may touch the center console or the user might be very close to the ceiling of the automobile. Not only the height, but also the length of this sleeping device may be problematic. For an average adult male user, this sleeping system may not provide enough comfortable sleeping space for the user to sleep without bending his knees, neck and back. The entire device may use only fabric to support the user's body, which can be substandard sleeping ergonomics. This material may be too soft to support an average weighted user without providing a flat surface. The system is possibly a recipe for little to no sleep, perhaps accompanied with back and neck pains. For a heavy user, this sleeping device might be impossible to use. First, the durability of the fabric material is questioned; if the material is too weak, it may fail and cause injury. Second, the "two stop members" which may be abutting against the outside of the vehicle at the joints between the doors might damage the doors and its paint when a heavy user is sleeping and turning his or her body on this sleeping device. Furthermore, this device may not be able to be adjusted inside the vehicle when the doors are closed. So if the user wants to adjust the level of the sleeper, he or she must exit the vehicle to make an adjustment; it is very inconvenient. The other weakness of this device is that this sleeping system may not be used when any one of the two doors, or both of them, are opened or not closed tightly. If the user is sleeping on this device, and forgets to lock the door, someone else who opens the door could cause serious injury to the user. The entire sleeping system may lack standard safety protection and protocol.

Another suspendable sleeping apparatus for use in an automobile is called the Exterior-Anchored Automobile Hammock, issued in 2015, U.S. Pat. No. 9,101,203B2. The inventor is Hanson Eugene Ely. This device could be regarded as an updated version of Eiserman's Motor Vehicle sleeper.

Ely's exterior-anchored automobile hammock may provide a suspended apparatus inside of a four door small automobile, such as a sedan. This sleeping device may attach to the exterior of the automobile through a plurality of straps and anchors that may utilize the automobile's front and rear windshields, trunk and hood. Users may be required to set up the exterior-anchored automobile hammock. This hammock sleeper suspends over the automobiles interior with the front seats reclined.

However, although Ely's invention may allow users to lie longitudinally in an automobile, the support body may still be made with fabric or other materials which may not provide a flat and strong support surface to the users. It might cause back and neck pain to the users. Additionally, this prior device does not appear to work well for multiple users. Because the support body is made with soft material, when two users lay on this device at the same time, the central part of the support body may sag down. The two users may be forced to the middle part of the hammock, it might not be comfortable for the two users due to the sagged shape of material caused by weight. Besides, just like Eiserman's invention mentioned above, the durability of the material of the support body is questionable when multi users are using this sleeping device at the same time.

Because this prior device is designed specifically for "small sedans", the larger area contained within a vehicle such as a 4-door pickup truck may have too large a supporting span length and area for Ely's hammock device to function with any form of practicality. Ely's device may not be pulled or stretched taut enough to overcome the immense center area sag forces, located far from any hammocking anchors.

Ely's device may cause damage to the paint and exterior finish on an automobile. Any fine dust or debris, an inevitable result of highway travel, which may be located under the device's supporting straps may scratch the paint due to an abrasive action caused by the variability of tensile forces within the straps while the user ingresses and egresses the device, or changes positions during use.

The Ely hammock may be hung inside of a small automobile with multi-straps running to the outside of the vehicle. Because part of the straps may be placed outside of the vehicle, on a rainy day, the straps may absorb and wick water along or through the straps from outside to inside the vehicle. Under certain conditions, the entire sleeping device may become wet and bring unpleasant experiences to the user.

Furthermore, because all of the buckles in the Ely device are on the outside of an automobile, users may have to adjust the height and level of the sleeping system from outside of the vehicle. The users may need a few tries to adjust the whole system to the level that they are satisfied. In a raining or snowing day, this adjustment system may be very inconvenient to the users. The systems' straps and buckles may also corrode and deteriorate whilst being constantly exposed to the harsh outside environment. Coastal users may experience a high degree of corrosion due to the oceans' salt spray, winter users may experience frozen buckles and straps, while ice and UV rays may make the straps brittle and potentially dangerous. Because the straps and buckles are exposed to the outside, the service life of these materials may be reduced and susceptible to tampering. It could cost users more money to protect and replace the materials.

Ely's exterior-anchored automobile hammock may be suspended right above the front seats and may require both front seats to be reclined. Therefore, it may be impossible for users to move from the sleeper to the driver seat and immediately drive away when user's life, safety, or property are threatened by emergency situations, such as wild animal attacks, inclement weather or threatening strangers.

Ely's system is also "free-hanging" from straps and thus may be prone to a swaying action, similar to that of an actual hammock, due to its lack of being rigidly mounted to the vehicle or other firm object. This system may not be supported on three axes and thus may be subject to a number of motions. Further, the device may not be supported in any manner other than directly perpendicular to gravity.

SUMMARY OF THE INVENTION

The multi-person adjustable, disassemblable platform (sleeping) system for automobile interiors can be used to provide an adjustable, suspended, flat, raised rigid sleeping platform with a stable sleeping surface inside various sizes of automobiles. Embodiments of the multi-person adjustable platform sleeping system for automobile interiors may comprise an aluminum alloy frame which may be hung and supported with straps and hooks, and perhaps two posts for under-platform support. On the top of the frame there may be a plurality of panels that include, e.g., wood or polymer boards which may be wrapped with foam and carpeting or other covering material. Embodiments of the sleeping device may suspend over the lower seat cushions of the automobile, within its interior; it may require the front seats to be reclined, and the head rests of the two front seats may need to be removed and subsequently reinstalled in a backwards fashion. This sleeping system is, in particular embodiments, designed for multiple users and it may allow all of the users to sleep comfortably without forcibly bending their knees, back, or neck in uncomfortable positions. Embodiments can present a full-sized sleeping apparatus which may allow ample space for most people. Additionally, in order to bring more convenience to users, the multi-person adjustable platform sleeping system can be adjusted between a single-person version and multi-person version. In this way, when a single person is traveling, he or she may only need to set up half of the sleeping system and may have more space to put his or her belongings.

The present invention provides in some embodiments a suspended apparatus in the interior of an automobile or vehicle, such as pick-up trucks, vans and SUVs', as but a few examples. It may be used as a sleeping or resting platform or support for travelers, outdoor enthusiasts, natural catastrophe evacuees, campers, and the like. It may also be used in lieu of, or as an additional "room", for Travel Trailers and RV's. In other words, Travel Trailer (TT) owners can use the present invention instead of a costly TT when only 1 or 2 family members are traveling; a father and son could likely choose to go "Noteling" and use this system, versus the TT for their weekend fishing expedition due to the possible mobility, flexibility, simplicity, and cost effectiveness of the present invention. Many TT and RV owners may already own a full sized pickup truck and thus may conveniently already own a practical vehicle for a present invention. TT and RV owners can use the present invention to accommodate an extra guest or two on their next vacation. As their family size grows, the present invention can be used for extra space versus the extremely costly, option of upgrading the family RV or TT.

This sleeping platform system may be disassemblable; certain embodiments, when installed, may comprise three main parts: a frame (perhaps aluminum alloy) that may include horizontal supports and be foldable and adjustable; a multi-panel platform (perhaps wood), perhaps wrapped with foam and/or carpet or the like (note that in certain embodiments, certain horizontal supports may be attached to, but not form part of, the panels to which they are dedicated); and non-horizontal supports (typically vehicle contacting), such as above-platform support supports (e.g., straps such as six coated S-hooks and nylon straps with adjustment members (such as a camlock)) and under-platform supports, which may include, e.g., cup holder support post and a driver-area post. Three of the above-platform supports may be connected with the head-rest support(s) of the back seats, two may be connected with the vehicle's side, occupant assist handles nearby the centerline of the vehicle. Another above-platform support may be connected with the assist handle of the front passenger side nearby the very front-right corner of the vehicle's interior. Additional above-platform supports may utilize the driver-side handle, which may be located nearby the extreme front-left of the vehicle's interior. Alternate non-horizontal, above-platform support options in keeping with the invention may also include various devices which may be hooked to the front dash area, such as the dash board's front lip at the interface of the front windshield and the dash; a small hook with a strap may be dangled and placed into the crevice between the window and the dash and the hook may be caught on the dash lip. In some embodiments, the strap may then lie atop the dash board, travelling from front-to-back, and may fall down towards the floorboard where something could be suspended, such as the present invention's frame. Devices may also be placed into the dash area, such as a crevice or small compartment for holding sunglasses or a wallet, which may allow for straps to be hung to rest. The steering wheel and steering console can also be used for support by resting or hanging straps or framing onto the steering wheel, console, or dash area. Suction cups on windows could also be used. In some embodiments, the front and/or rear cup holders may support one or more cup holder supports that act as under-platform non-horizontal supports in certain embodiments. These two supports can provide additional support and stability. On the edges of the frame, in some embodiments there may be six hanging rings, which can be used for connecting with the hanging hooks. After that, the users may place the platform on the top of the frame. After adjusting the level, height, and flatness, users may start using the present invention. Note that in certain embodiments, the platform support frame is only created upon assembly of frame components (e.g., horizontal supports, which may include panel-attached horizontal supports, and/or right-left horizontal support bars). Such frame may be suspended from above by vehicle contacting, above-platform, non-horizontal supports, and supported from below by vehicle contacting, under-platform supports (e.g., the driver area post and the cup holder post). Note that the driver area post may be necessary only where a vehicle has no driver assist handle to which a vehicle contacting, above-platform, non-horizontal support (e.g., a strap) can be attached.

The present invention can also be used to improve pet travel. For pick-up trucks, this sleeping system might be connected with the back of the truck's bed via the back window. Today, most pickup truck manufacturers may feature rear windows that slide open or roll down. In this way, users of the present invention may be able to conveniently travel with their pets and perhaps easily access them via the rear window opening. A doghouse, cathouse or outdoor pet-tent could be installed with an opening connected to the vehicle's rear window. The present invention can be an economical and convenient method of travel for pet owners. With this system the users may not have to find a pet friendly hotel and spend extra money on a hotel stay.

It could also be safer and more humane for people to take their cats or dogs with them when while traveling. Keeping pets at other people's place or in a pet overnight care center could be another worry and expense for travelers, and often times can be very stressful for the animal. For overnight care, the average price for each night for one pet is about 65 dollars. For owners taking a one month trip, a pet sitter could cost them 2,000 dollars. Besides, the quality of pet care could be questionable. Pets may experience a tragedy while at overnight care centers. Also, things can occasionally go wrong when strangers have access to people's homes, and know their vacation schedule, while pet sitting for the family. Occasionally household items can get stolen or damaged, or people may overstay instead of briefly caring for the animal. People may not like strangers in their homes, especially when they are not home. People also may not like others caring for their loved and special pet. Thus the present invention may provide pet owners with a reasonable and affordable travel option; it may also increase the overall well-being of pets and make pet ownership more desirable and less of a burden because of this new and practical travel method.

The present invention may also be utilized simply as a stable platform, that might not even be used for sleeping. The platform includes several panels that are able to be connected tightly and may ensure the entire platform is stable and without large gaps (gaps may be prevented by interpanel compression devices, such as, e.g., heavy duty Velcro, or some type of latch, clamp, telescoping, lockable, panel-attached horizontal supports, tension strong straps, and/or temporary fastener). As shown in FIG. 8, the solid red rectangles represent pieces of Velcro which might be placed under, atop, or between each piece of the platform and may ensure stability of the platform's surface.

Embodiments of the inventive technology offer practical and affordable sleeping environments within the interior cabin area of common passenger vehicles such as pickup trucks, vans, SUV's, or any vehicle. It was created in order to address people's frustrations regarding pricey hotels, or their tiredness of fussing with tents while camping. In certain embodiments, with absolutely no vehicle modifications, this system amazingly creates a comfortable sleeping area that is equivalent to the size of a queen bed.

With embodiments of the inventive technology, what was previously someone's daily commuter vehicle is now a medium through which individuals or micro families can travel, with a stowed system (whether stowed in the vehicle or elsewhere) that can be quickly deployed to create an interior sleeping compartment, basically converting the automobile into a new type of recreational vehicle that may be called a Mobile Travel Accommodation, or MTA. At present, embodiments of the inventive system are best suited for sport utility vehicles and four-door pickup trucks (Dodge Durango, Ford F-150/250, as but a few examples). This product possesses a sizable market opportunity, enjoys a meaningful competitive advantage, and creates significant value for consumers.

There are only a handful of lodging options available for the traveler. Soon will exist this entirely new alternative. Existing lodging solutions are either expensive and luxurious, as in a hotel or conventional Recreational Vehicle (RV), or flimsy and non-practical, as in an automobile backseat air-mattress.

With the emerging ZIMTA (zero increment MTA) industry, people can travel about and sleep with fewer financial and physical burdens. Hotels, tents, and RVs are traditionally the primary travel lodging options. Patrons of hotels are charged for each night of stay, which is an incremental form of pricing. Tent buyers, on the other hand, enjoy the economics of limitless nights for one price; a tent is a zero-increment camping option. RV ownership is laden with both tangible and non-tangible incremental burdens.

Embodiments of the inventive system are the only practical zero-increment mobile lodging option available. It effectively offers consumers an affordable type of quasi-RV experience. With the installation of this simple system, one now has an all-season and all-weather lodging option within the controlled environment of his or her own vehicle. It is more comfortable, safe, functional, affordable, and versatile than any other single alternative product.

This system, in certain of the many embodiments, comprises an aluminum alloy frame which is both hung by straps and supported from below by posts (e.g., cylyndrical objects). Similar to an actual bed, above the frame is a platform (that may be soft padded) made up of panels. The platform, in certain embodiments, is wrapped with foam padding and carpeting, resembling a mattress, to a degree. While sleeping, occupants can extend their legs and arms without bending neck or back. In fact, in certain embodiments, multiple users can sleep comfortably. There are single-person and multi-person configurations. When a single person is traveling, he or she need only to set up about half of the system. For the most part, the initial products are one-size-fits-all.

Certain embodiments of the invention address a single manufacturable and marketable product that fits into full-size passenger pickup trucks with 4-doors, SUV's and vans. These vehicles have large interior compartments which make them ideal quasi-RV candidates.

When a single occupant is berthing, embodiments of this system are versatile in a way that allows for a noticeably reduced installation. In other words, the certain embodiments have two modes of operation, i.e., single and double-plus. If the user intends to arrange his or her NSS into its double-plus layout, the installation methodology will first entail the setup for a single occupant; afterwards, the system is laid-out for double occupancy. The components used to configure the double-plus system are therefore "add-ons", or extensions to the single layout.

In certain embodiments, the platform rests at a level equal to, or above the vehicle's arm-rest and this zone actually becomes livable area or part sleeping platform. In total, in certain embodiments, occupants have a sleeping expanse roughly equivalent to the size of a Queen size bed. Maximum capacity will ultimately be left to the discretion of the user.

Another approach to assess berthing capacity is a comparison of the seeping expanse of certain embodiments of the inventive technology to that of a tent. No official industry standard exists that defines per-person tent dimensions, but most 2 and 4-person tents offer about 15 square feet of area per adult and half that to children. Accordingly, the sleeping expanse of certain embodiments of the inventive technology is equivalent to about a 2 or 3-person tent, but the usable living space is considerably greater. Also, the walls of the tent slope inward more dramatically than the walls of the truck. The effective interior space of an MTA is far greater than a tent with a similarly sized footprint. An average 2 or 3-person tent feels considerably smaller.

Embodiments of the inventive technology may offer the following advantages:
Functional: Provides unquestionable berthing satisfaction.
Level-able: Adjustable supports means the platform is always flat and level, and that it can be adjusted so that it is level.
Operable: Anyone can install, adjust, remove, store.
Manufacturable: Limited workmanship, labor, technology.
Supply Chain: Easily sourced materials and few components.
Safety: Shelled protective enclosure. Drive away in moments.
Time Savings: Depart campsite quickly. No need to exit vehicle.
Location Versatile: Lodge anywhere, anytime. No drives to hotels.
Pet Friendly: No pet hotels. Easier to accommodate furry friends.

One quality of the platform system, in embodiments, is that it makes use of a pre-existing space at a moment in time when said space is not being actively utilized. In other words, what used to be nothing more than a parked pickup has now suddenly become someone's useful sleeping compartment. A new object need not be created or hauled. Purchasing an RV is the purchase of newly created space; another entity which needs to be maintained, stored, repaired and maneuvered about. It makes sense to insert a device into an everyday automobile which converts its unutilized space into something purposeful; people are thus reducing the non-productive-time of their existing assets.

One advantage of an in-truck system afforded by embodiments of the inventive technology, as opposed to a Roof Top Tent (RTT), relates to the center of gravity. The weight of a roof rack and tent in an off-camber situation is more prone to a roll-over event. Crew-cab pickup trucks undeniably serve as a well functioning berthing compartment.

As shown in FIG. 8, the present invention may be easily disassembled from its installation mode, and dismantled or removed from the driver seat area. Considering user safety and convenience, the driver area panel might be foldable, slide-able, removable, rotatable, etc. In this way, the user or users may have additional sleeping space, but may also have fast and easy access to the driver's area in the event that occupants need to immediately drive away in an emergency situation.

The present invention may also provide conveniently connected support straps (a type of non-horizontal, above-platform support) on interior occupant assist handles of the vehicle. For connecting the platform to the handles, as shown in FIG. 10, the strap may have two parts. The first part may comprise of a double sided Velcro strap member and possibly a camlock type of device, or other adjustable piece of connecting hardware. This member may be secured to the vehicle via a method of wrapping the Velcro about the handle. The second part of the connection system may simply be another strap member which may be permanently fastened or temporarily affixed to the frame and/or platform. When users set-up or install the sleeping system, they may simply connect these two parts together. And when they do not need the sleeper, they can quickly disconnect the two parts, remove or store the platform/frame, and possibly leave the Velcro and camlock part remaining affixed to the vehicle's handles. People may still use the handles in a normal fashion and this may enable the user to rapidly setup and breakdown the sleeper system.

One reason that the sleeping system may be composed of several individual panels, is so that it may easily be stored underneath the vehicle's backseats. Part of the stowed system (as opposed to installation mode) may extrude from beneath the seat into the floorboard area where a backseat occupant may place his or her feet while seated. Also, the size and weight of each panel should be manageable and safe for most male or female users. After the user or users separate the panels and frame sections, they can store the pieces beneath the vehicle's backseat and utilize the backseat area, and the entire vehicle, in a normal fashion. There may not be need to remove any parts from the automobile, thus the sleeping system may always be there when needed. It may not be necessary to laboriously and inconveniently store the sleeping system at a person's residence.

The present invention is designed, and may function similarly, to residential bed. A real bed may be comprised of a frame (perhaps metal), possibly a box spring platform (perhaps wood), and possibly a mattress, perhaps of a sponge-like material. The present invention may have a frame system which can support a sturdy platform, atop which may rest comfortable foam pad that may be upholstered. The sleeping system's physical design may be somewhat akin to that of a real bed in its purpose and the way it functions. Possibly similar to a residential bed, the frame of the current invention may first be assembled, then possibly the box platform and mattress may be laid atop. Also similar to a residential bed, the current invention may function to elevate a person above the ground. The sleeping system's frame may elevate the entire sleeping system above the vehicle's cold floorboard, and the lower seat cushions, thus possibly creating an air gap. The distance from the earth, along with additional insulating materials which may be provided by the systems platform may help occupants maintain body warmth. Third, the invention's padded and upholstered top may provide users with a comfortable and warm sleeping surface, perhaps even insulative, like a residential bed mattress, or a sleeping pad. These three points may provide an enhanced sleeping experience in comparison to sleeping in a tent or close to the ground and within a thin-shelled and non-secure fabric enclosure. A bed in someone's home may provide comfort, warmth and security by creating a flat, cushy, insulated sleeping surface, possibly within a hard-shelled, enclosed and insulated structure such as the home. Likewise, the present invention can provide a similarly comfortable and perhaps spacious sleeping surface within a hard-shelled, enclosed and insulated structure (the car).

Because the interior design of vehicles may vary, some vehicles may not have a middle storage console, nor cup holders in the middle center console area. For this situation, placing and adjustable support going to the vehicle's floorboard may be necessary. For example, a jackstand may function as an additional support or substitute supportive member for the device. Note that even when the platform system is used in vehicles without such console, the system may have a console area panel (it would be between the driver area and passenger area panels).

In some variations of the present invention, the seats themselves could be used to provide support upon the attachment or connection thereto of vehicle contacting, non-horizontal supports. The vehicle's front seats may be in a reclined position and can be adjusted up and down with powerful internal motors, or the like. Any part of the seat, seatback, headrest, or anything affixed to a seat, seatback, or headrest may be used as an adjustable component to provide support. The backseat, although possibly not adjustable, may also function to provide support for the sleeper system.

The multi-person adjustable platform sleeping system may allow the user to create extra headroom if so desired. This may involve reclined front seats, which may determine how much distance is between the surface of the platform and the ceiling of an automobile. Again, because the interior design of vehicles may vary, not all vehicle's front seats may be able to recline to an almost-flat position. Some vehicle's front seats may have a somewhat limited range of motion in terms of the degree, or extent to which the seatback is capable of reclining. These types of automobiles may provide considerably less headroom for users whom are laying or sitting on the top of this sleeping system. To provide additional headroom, a substitution of the panels may be utilized. As shown in FIG. 10 the two rear panels have been replaced by a netting system. This netting system may compose of several adjustable straps and possibly a strong netting material. As in FIG. 10, the seat's headrest is not covered by the netting material. In this case, the headrest and seatback may be used as vehicle provided support. In order to provide the flattest possible surface, the adjustable straps can be stretched taut and thus, may assist in supporting the user's body. In this way, the user may not only have extra headroom, but may also have a flat and spacious sleeping surface. The headrest, in this instance, may conveniently function as a pillow (29). The seatback may also extend up and through the system, not just the headrest as depicted in FIG. 10.

Another possibility to create additional headroom in some vehicles may be to remove the center storage console from the vehicle, or perhaps design the sleeping system to morph around the center console. In this way, the majority of the sleeping system may rest lower in some vehicles and thus possibly create additional headroom for the sleeper system user.

In certain embodiments, the sleeping system could have sections which rest at different levels or elevations. In this way, the majority of the platform could rest in as low of a position as possible while other sections or an area may be raised slightly higher because of an underlying obstruction or obstructions. For example, the sleeping system's backseat area (rear panels) could rest at a lower elevation in comparison to the platform's forward-most area. The forward area of the vehicle may contain more elevated underlying obstructions such as the middle storage console, or possibly a seatback which may not recline. In this instance, the backseat area could provide more comfort due to the increased amount of available headroom. A ramp of pillows could be used to make the interface between the differently elevated pieces more comfortable for sleeping, or the lower sections could be raised up to form 1 large flat surface, albeit possibly with a more limited amount of headroom.

In an embodiment, the panels of the platform system that are suspended above the vehicles backseat area (the rear panels) may easily fold, rotate or slide away, possibly in a fashion similar to the driver area platform (platform in the area above the driver's seat rear cusion). FIG. 12 is an illustration of the sleeping system configured in a manner which may allow easy access to the vehicle's backseat area. FIG. 11, depicts the system's frame system as may be found in at least one embodiment, and highlights hinges (circled and labeled (31)). This may allow the 2 rear panels 1, 2 of the system (32 in FIG. 12) to fold over 180 degrees and possibly come to rest atop the system's forward sections. (33 in FIG. 12). The purpose of this folding area is to possibly allow the user easy access to the backseat area. This may be convenient because after an extended period of time sitting upright on the platform, some user's heads may be slightly crooked to one side, possibly due to the limited amount of headroom. The backseat area may now become a spacious and comfortable area if occupants wish to lounge about for extended periods of time, such as on a rainy day. In some variations, the exposed backseat area can be used as sort of a staging area while users are entering and exiting their sleeping compartment. In other variations, the exposed driver seat area may act as the sleeping compartment's staging area. For example, multiple occupants can simultaneously enter the sleeper via the vehicles backdoors. The process of entering may not be different than how one would normally enter the vehicle as a passenger. Once inside, and in a seated position on the backseat, occupants may easily take off their shoes and change into their sleeping attire. The occupant's belongings may be easily stored in the backseat and floorboard areas. Once an occupant is ready to transfer from the backseat onto the sleeping platform they may simply put their knees atop the backseat and form their body posture into a kneeling position and may easily "crawl up" and onto the sleeping platform, possibly similar to how a baby might crawl to get atop a pillow or parent. Once occupants are atop the sleeping platform they may simply fold down the 2 remaining platform sections to possibly create a spacious and clutter free sleeping platform which may now encompass almost the entirety of the vehicle's interior. However, not all embodiments include this feature.

The present invention may have a unique support device (a cup holder post) that may be designed to fit securely within the vehicle's cup-holder and support a panel (e.g., a console panel) thereabove. As seen in FIGS. 13, 14, and 15, in some embodiments the lower end of the cup holder post may be placed inside the cup-holder. Once inserted, the wing nut may be screwed-down, which may cause the large conical-shaped washers to compress, or squeeze, the rubber element. The squeezing action may cause the rubber element to expand radially, thus possibly increasing its outside diameter. As the diameter increases, the rubber element may begin to radially press against the walls of the cup-holder. The lower end of the unit may comprise of a test plug. Connected to the top of the lower end may be an externally threaded coupling, to which the internally threaded cap may screw onto. A platform may then be affixed to or simply rest upon the top cap. The cap may then be screwed up or down to adjust the vertical height of the platform. The end result may be an adjustable support which can be firmly and quickly attached to the center console.

The embodiment shown in FIGS. 16, 17 and 18, shows the bottom cap of a cupholder post, with internal threads attached to the surface of the pluming test plug. The test plug is perhaps a hard plastic cylinder, similar to a pluming PVC pipe, perhaps with external threaded ends is screwed into the bottom cap. The top cap may screw on to the opposing end, as the threaded cylinder is perhaps screwed into, and out of, the end caps, on which the sleeping platform may be resting or affixed atop, and thus, may simultaneously move up and down.

The frame of the present invention might be capable of fitting within a wide variety of vehicles due to its adjustable design features. The center console in vehicles (between the driver and front passenger) may vary in size and shape, possibly depending on the vehicle's manufacturer, year, make, and model. Referring to FIG. 19, the areas labeled as (3) and (6) may be the panels above the driver and front passenger seat, respectively. Areas (7), (4) & (5) may cover the center console area, while (4) & (5) may specifically be located above the center console's aft cup-holders, and (7) may be located above the console's storage lid. Note that in certain embodiments, these three panels may be combined into one panel (e.g., a console area panel), as shown in FIG. 22.

FIG. 20 depicts an embodiment which illustrates the ability of the frame members to adjust around various sizes and positions of center consoles/cup-holders. Note that in certain embodiments, the frame is only created upon assembly of the system (instead of being a foldable component that is unfolded, fit into the vehicle, before it is supported and panels placed atop of it). This embodiment is also depicted on the four diagrams of FIG. 19. Shown is how the size and shape of panels (7), (4), & (5) can change (indeed, in certain embodiments they are only one panel), while the platform's perimeter may remain unchanged. Certain supports (which make up the frame) that are telescoping, for example, may be used to achieve this function/ability. FIG. 21 is an embodiment showing that a telescoping tubing could be used to expand or contract part of the framed areas around the center console. Multiple attachment points could be used in lieu of the telescoping tubing; in this way adjustments would be made to pre-determined positions, perhaps similar to adjusting a belt. There may be 3 positions which the user could select depending on the center console configuration of his or her vehicle.

In order to help to keep the sleeping platform firmly connected to the vehicle, any bars or supports generally, may have screw-out rubber stopper, or castor like devices. The purpose of these devices may be to provide lateral support for the platform and help keep the platform centered within the vehicle.

BRIEF DESCRIPTION OF THE DRAWINGS

FIG. 19 shows center aft cup-holders (74) and a center forward cup-holder (75).

FIG. 21 also shows four possible areas with telescoping tubing (77) (represented by parallel lines on either side of a broken line).

FIG. 22 shows an assembled frame. This frame is secured within the vehicle through the use of non-horizontal supports (above-panel (not shown) and/or under-panel (shown)).

DETAILED DESCRIPTION OF THE PREFERRED EMBODIMENTS

Figure 1:
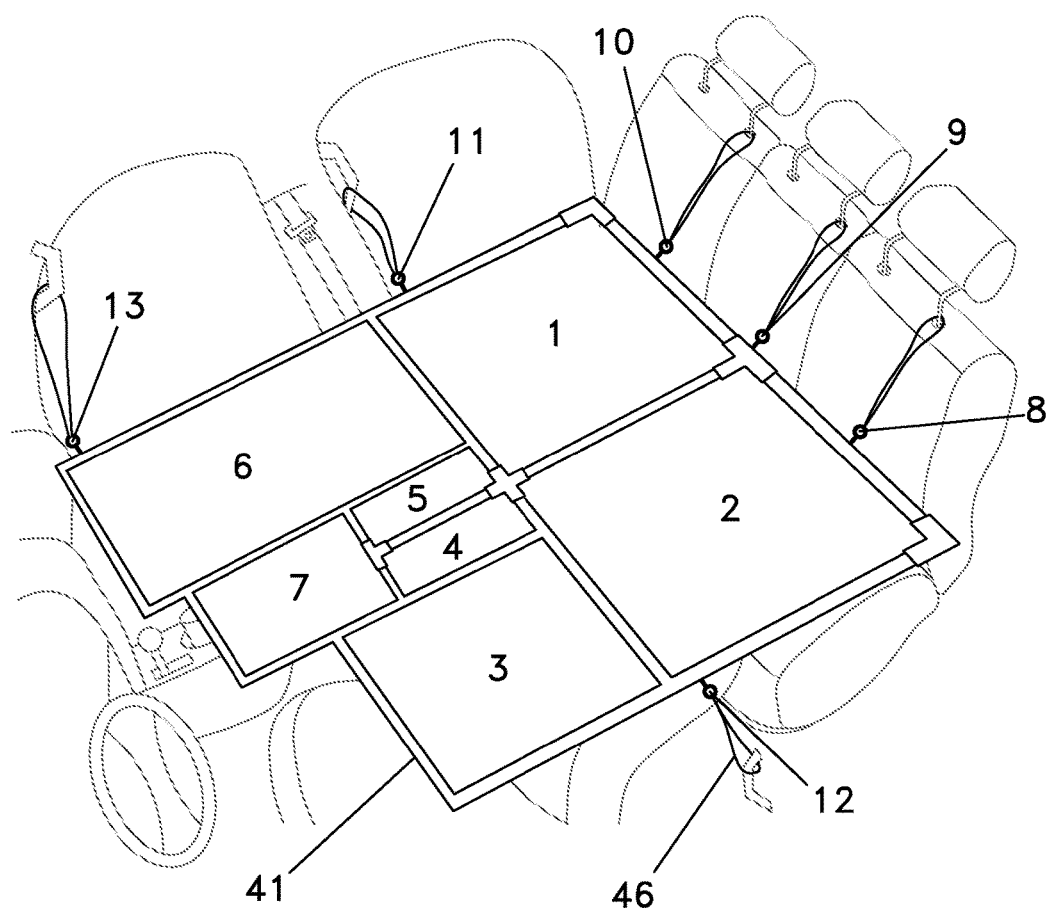
FIG. 1 shows the overall view of one embodiment of the present invention inside of a pick-up truck, in an embodiment of the inventive technology. The front seats are reclined and the front-seat headrests are either removed or placed into a reverse position for temporary storage.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

At least one embodiment of the inventive technology may be a disassemblable (i.e., able to be disassembled) platform system in a vehicle interior (e.g., interior of a pickup truck cab, or other vehicle, such as, but not limited to a SUV or van) that (after installation), comprises: a plurality of panels (generally, 40, as installed) relatively positioned to form a flat, raised rigid platform 41 in a vehicle interior and that is elevated above lower seat cushions, where such panels include two rear panels 1,2 (i.e., in the rear seat area), a driver area panel 3, a passenger area panel 6, and a console area panel 42 between said driver area panel and said passenger area panel. The system further includes horizontal supports 43 that underlie at least some of said panels, such horizontal supports including at least two right-left horizontal support bars 44 (i.e., a horizontal support bar that is installed in a right-left direction defined by the vehicle); and panel-attached horizontal supports 45, each of which is attached to a panel to which it is dedicated.

Note that use of the term bar instead of support does not mean that such items are necessarily different in size, cross-sectional shape, etc. (e.g., bar simply implies that such bar is not panel-attached via brackets). At least some of the panel-attached supports are extended horizontally beyond the panel with which they are attached so that a portion thereof underlies at least one neighboring panel. A panel-attached horizontal support can be extended simply by: translationally sliding the entire support relative to the panel and the brackets that attach the support thereto; or extending the length of the support, e.g., telescopically (a support that can be re-configured in either of such manners is an extendable support). Accordingly, an extendable support need not be length extendable (because instead of changing the entire length of the support so that it underlies a neighboring panel, it can simply be translationally slid so that a portion of the support underlies that panel. In either situation, the extended support may, but need not necessarily, be locked in extended position (e.g., via thumbscrews, biased pins in holes in the support or brackets that can lock (e.g., via a screw) the support in position). Each of such supports may be attached to a panel simply by attachment (perhaps sliding attachment) therewith via brackets. Note also that the inventive technology is deemed to include a wide variety of frames, including frames where there is only three or two types of horizontal supports.

The system may further comprise vehicle contacting, non-horizontal supports 46 that directly contact at least some of said horizontal supports (or panels), and the vehicle, and provide support to the platform. The non-horizontal supports comprise at least one vehicle contacting, under-platform, non-horizontal support 47, and vehicle contacting, above-platform, non-horizontal supports 48, wherein at least some of said vehicle contacting, non-horizontal supports are connected at one end to one of: vehicle occupant assist handle, and rear seat head rest support. The vehicle contacting, under-platform, non-horizontal supports may comprise a cup holder post 49, and a driver area post 53. The system may further comprise at least one inter-panel compression device operable to bring neighboring panels closer to each other, in a horizontal plane; such devices may be: a clamp; telescoping, lockable, panel-attached horizontal supports; and a tension strong strap 52 (i.e., like most straps, a strap that can resist tension to a sufficient degree). Note also that certain embodiments of the platform system (whether the installed system version or the unassembled version) may, in addition to horizontal supports, have only one type of vehicle contacting, non-horizontal support (e.g., either above-platform, non-horizontal supports, or under-platform, non-horizontal supports).

A related aspect of the inventive technology relates to the apparatus in its unassembled configuration/mode; it may be described as an apparatus assemblable into a flat, raised, rigid platform that occupies at least part of a horizontal plane in the interior of a pickup truck cab. Note that the descriptive nomenclature based on the orientation of supports, etc., in their installation/utilization mode will be used to describe such parts even in their pre-installation mode (e.g., stowage or delivery mode). Accordingly, a stowed part, e.g., a non-horizontal support that is being stored and is not installed, that is horizontal in its stowed configuration may still be termed a "non-horizontal" support simply because in installation, such part is in non-horizontal orientation. Details regarding the installation in a pickup truck (or other vehicle) of certain embodiments of the inventive technology may be as indicated in the "Hotel Instruction Manual", provided alongside this filing and incorporated herein by reference in its entirety.

Generally, horizontal supports may also include left-right horizontal support bar(s). The horizontal supports may include panel-attached supports, some of which are extendable (and perhaps also attachable to each other). Note that panel-attached can merely mean directly attached to a panel, even slidingly attached, via, e.g., brackets. The attachment of panel-attached horizontal supports to the underside of a panel via brackets may enable slidable connection. Another way of achieving slidable panel-attached horizontal supports may be making such supports telescoping, but fixed relative to the brackets. In either slidable support embodiment, panel-attached horizontal supports may be lockable in position relative to the panel with which they are attached.

Vehicle contacting supports may be non-horizontal supports and at one end, directly contact a part of the vehicle, using it for support, and another end contact panels directly, or instead contact horizontal supports directly (whether such supports themselves directly contact panels or they directly contact horizontal supports such as, e.g., panel-attached supports associated with such panels). Non-horizontal supports include vehicle contacting, under-platform, non-horizontal supports such as cup holder post(s) and/or a driver area post for use where no assist handle (or other vehicle component) exists to which strap can be attached and from which such strap can be suspended. A driver area post may be connected to a horizontal support (e.g., a panel-attached, horizontal support) that is telescopically attachable to, e.g., another horizontal support (e.g., a panel-attached support; typical placement area for the driver area post upon installation is forward left side of driver panel. It can possibly also be locked relative to such support horizontal support. Note that any support termed vertical (or horizontal), need not be perfectly vertical (or horizontal) upon installation. Any post height can be adjustable (and lockable at a desired height).

Particular aspects of the invention may involve two right-left horizontal support bars that are suspended using non-horizontal, above-platform supports. One bar may be a rear bar and be supported by straps connected to the bar and to rear seat headrest supports. Another bar may be a central bar supported by straps connected to the bar at far right and left ends and to vehicle occupant assist handles. In fact, placing these two bars in the vehicle, and supporting them as indicated, may be the first step in establishing a platform system in the vehicle (in certain embodiments), perhaps after reclining front seats and removing front seat headrests (note that in certain embodiments a removed headrest may expose a hole that can be used to support an under-platform support such as a post). Subsequent steps may involve establishing panel-attached horizontal supports (and the panels to which they are attached) directly on the two bars. This may involve extending such supports as necessary (if they are not already permanently extended), e.g., in order that they contact a bar(s) or underlie a neighboring panel(s)), and perhaps locking them in place. Extended panel-attached supports (whether manually extendable or permanently extended) may thereafter be attached to another panel-attached support of a neighboring panel, either telescopically or via straps, Velcro™, thumbscrews, wingnuts, bolts, magnets, etc. Extending horizontal supports may involve, e.g., loosening a thumbscrew on telescopically mated supports, loosening a bracket connection, or simply sliding supports that are sufficiently loosely attached to a panel, as but a few examples. Additional details regarding installation steps may be as indicated in the "Hotel Instruction Manual", provided alongside this filing and incorporated herein by reference in its entirety.

Panel-attached horizontal supports running in a fore-aft direction (defined by the vehicle) and that are on the far left (driver side) and far right (passenger side) (among other supports) may, of course, be extendable (or possibly not because they are permanently in an "extended" position beyond the edges of the panel to which they are attached), as is the case with all supports. Regardless, such supports may be attachable to each other or to one or both of such bars in any manner (e.g., via Velcro™ straps, thumbscrews, or other known attachment manner). They may also be attached to vehicle components such as vehicle occupant assist handles (via non-horizontal supports such as straps). At some point, under-platform, non-horizontal supports should also be set in place so that they underlie a panel (note that in certain embodiments one post may underlie a console are panel 42 while another may be connected to the right front of the driver area panel). Interpanel compression devices can be used to bring panels in towards one another, eliminating gaps and enhancing platform stability.

Note that direct support provided by a non-horizontal support can be applied to more than one panel via a robust support system where horizontal supports are under more than one panel and act to distribute the support to such panels. Panel-attached horizontal supports that extend from under the panel (whether via sliding or not) enable the support provided for the panels that they're attached to applied to adjacent panels that such extended horizontal supports underlie. This can be achieved by configuring (upon strategic placement and sizing) such supports so that one panel-attached support fits into another (and if such telescoping supports can be locked in relative position, then they can also act to keep edges of the one panel tightly against the edge of another), or configuring such supports (e.g., upon strategic placement, e.g., staggering) so that the attached supports of one panel don't hit against the panel-attached support(s) of another (neighboring) panel. Note that in order for a support (e.g., a horizontal support) to provide support for a panel, there need not be direct contact between that support and that panel (because such support can directly contact another support (e.g., panel-attached horizontal supports) that directly contacts the panel). Note that the cup holder support post can support the console area panel directly; horizontal supports below that and other panel(s) can apply the post's support applied directly to the console area panel to such other neighboring panel(s). Horizontal supports, e.g., panel-attached horizontal supports dedicated to the driver area panel and the passenger area panel can be extended so that a portion thereof extend under the middle (console) area panel. Such extended supports (e.g., a support(s) from the driver area panel and support(s) from the passenger area panel) can interface, contact, or connect with each other. Any such connection can be achieved via a connector (e.g., clamp, telescoping thumb-screw connector, etc.) below the middle (console) area panel. As with any of the extended supports, there may be provided means to lock such supports in extended position (e.g., thumbscrews, biased pins and a plurality of holes, holes and a cotter pin, etc.

A variety of downward force resisting supports can be used as non-horizontal supports to provide the suspension force to the horizontal supports of the frame and the panels above it, as seen in certain embodiments. Of course, above-platform, non-horizontal supports must be sufficiently strong in tension while under-platform, non-horizontal supports must be sufficiently strong in compression. Above-platform, non-horizontal supports can include adjustable straps that are suspended from rearseat headrest supports, straps suspended from occupant assist handles, while under-platform, non-horizontal supports can include posts. Note that the term straps is broad, and includes even connections formed of cables, wires, or other tension strong material/devices. Above-platform, non-horizontal supports can be attached at one end to a vehicle part, and at the other end to any horizontal support, including but not limited to support bars (e.g., that run in a right-left direction), and/or panel-attached supports that run in a fore-aft direction, as but a few examples.

Inter-panel compression devices may be operable to bring one installed panel toward another in a horizontal plane. They may include, e.g., a clamp that acts on two panel-attached horizontal supports, one of one panel that is parallel to a bar of another panel; panel-attached horizontal supports that are telescopabable into a support of a neighboring panel and that are lockable in that (desired) relative position; and a tension-strong strap that brings one panel in towards another (e.g., Velcro™) (such strap can wrap around a bracket or panel-attached support of one panel, and a bracket, or panel-attached support of another to draw them together). Or a strap can move only one panel in a direction towards another with a strap wrapped around a bracket or panel-attached support of one panel and a horizontal support such as bar. Interpanel compression devices help to eliminate gaps between installed panels, help to improve platform stability, and act to distribute support applied to one panel to another.

Note that certain embodiments of the inventive technology can be a kit, whether custom made or selected from a limited number of designs pre-configured for a specific vehicle. Further, the supports (i.e., the system without the panels) may form a frame that is supported by non-horizontal supports, and that supports the panels and thus forms the platform system. Any of the support can be outfitted with rubber or plastic sleeves. A certain pre-made version of the platform system may fit into more than one vehicle; there may be several of such versions in order to provide a system that fits in the interiors of all vehicles that the manufacturer wants to provide for.

Figure 3:
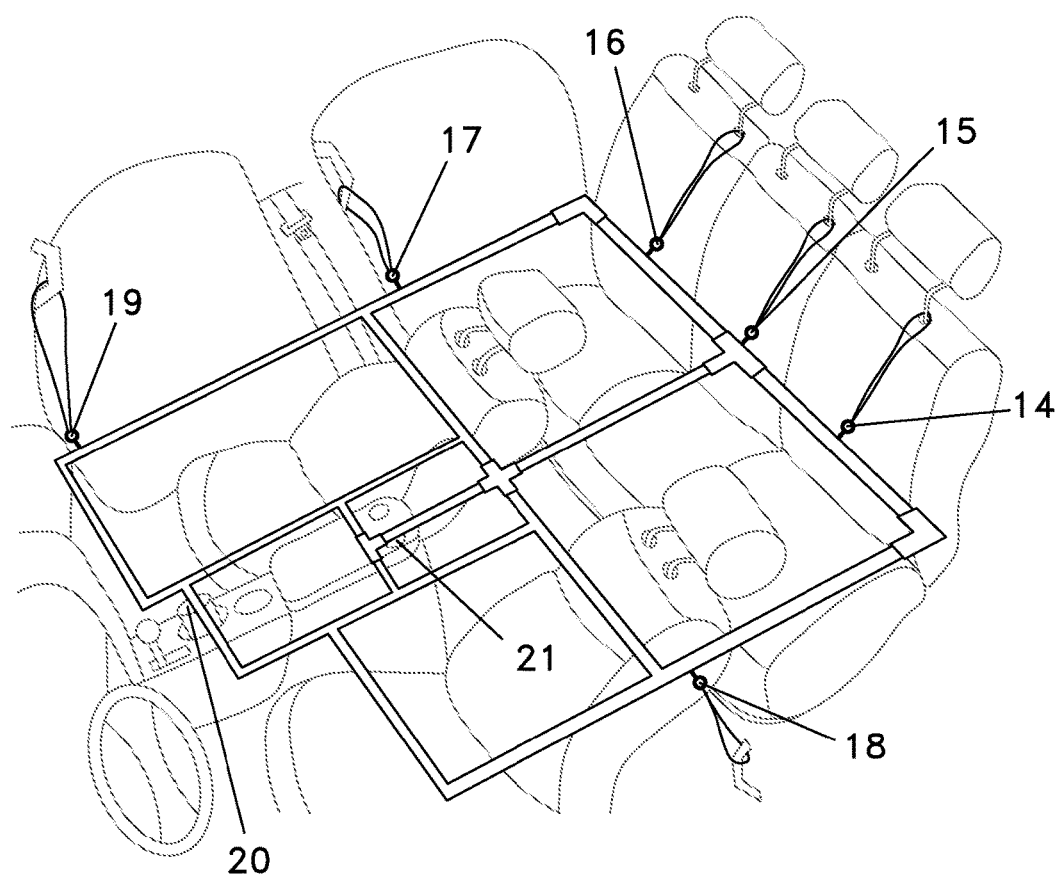
FIG. 3 shows the view of the entire aluminum alloy frame embodiment with tensile and compressive supports, in an embodiment of the inventive technology. This embodiment has users recline the front seats and reinstall the head rest of the front seats in a backwards or reversed position. Alternatively, the user can completely remove the head rests from the front seats.

Preparing the automobile and making it ready for the multi-person adjustable platform sleeping system for automobile interiors according to the present invention can involve a variety of steps. For some embodiments it may involve reclining the front seats as low as possible. Ideally the seat will recline to a position equal to or lower than the top of the center console. In vehicles where this is possible, the center console may then become the lowest possible position, or height, of the sleeping platform. If the vehicle's front seats do not recline to an elevation lower than the top of the center console, the seats themselves may become the limiting factor for platform elevation within the vehicle's interior. The elevation or height of the sleeping platform can be an important parameter because it may determine the occupant's permissible headroom. Removal of front seat headrests (and other headrests, as appropriate), can maximize headroom above the installed panel. Ideally, the sleeping platform may be suspended, or possibly rest atop the vehicle's center console. This configuration may allow for maximum amount headroom and is depicted in FIGS. 1 & 3 above and may stabilize the platform. This configuration is possible in vehicles such as newer Ford F-Series vehicles and can allow for about 27 or 28 inches of headroom throughout the entire living compartment. Because the vehicle's sidewalls tend to construct a rectangular side walled living environment, embodiments can provide better headroom. This is unlike that of a tent or the like with inverted "V", such as a tent, the occupant's allowable headroom may be highly variable depending on his, or her, position within the tent.

The present invention may be used without reclined seats, or while one and/or both front seats are reclined. FIG. 1 depicts an embodiment with a back seat area, and rear panels 1 and 2 may be installed and remain in the vehicle at all times if the user desires (this, and supports therefore, may be a product in and of itself). For some embodiments, when their destination is reached, the user or users, may recline their seats, perhaps remove the headrest, and install the remaining frame supports and sleeping panels. For a single traveler, panels 1, 6, & 5 may be installed at home, and might even never be removed. In certain embodiments, the driver seat may be in a normal "drivable" position while the passenger seat may be reclined and headrest removed. When the single traveler reaches his or her destination, the driver may simply park and roll onto the "bed", or sleeping platform area composed of panels 1, 5 & 6.

For some embodiments and some vehicles, the head rests of the front seats may need to be taken off or reinstalled backwards to optimize the height reduction desirability of the reclined front seats, as depicted in FIG. 3.

In some embodiments and vehicles, the cup holder(s), forming part of the general center console area may be used as compressive support points and may help to provide support for and stabilize the platform(s). Consoles tend to be rather structurally sound because people are climbing about the vehicle's interior and placing high amounts of weight on the consoles in various ways. Thus the console's cup holders may be deemed sound enough to support the distributed load a rigid platform provides. The greatest forces any supporting member will experience are likely along the axis of gravity.

The rigid frame of the platform system may distribute loads so that not any single member is experiencing 100% of the forces. Such distribution may be achieved by the network of horizontal supports underlying the assembled panels. In full capacity of certain embodiment of the present invention, the platform may be supported at 8 points (6 in tension, 2 in compression), FIG. 3 (20 and 21) illustrates how the vehicle's cylindrical cup holders may be used in some embodiments, perhaps such as with a cylindrical accessory to create an adjustable supporting member, or an adjustable cup holder post. In other words, the post can be lowered and raised to flatten and level the frame and/or sleeping platform. Each non-horizontal support may be designed to be easily adjustable. If the vehicle is not parked perfectly level, gravity may work against the occupants in uncomfortable ways. Embodiments of the present invention can easily be leveled by adjusting any or all of the non-horizontal supports from within the vehicle; in other words, the user or users may not need to exit the vehicle to adjust or level any of such supports. Furthermore, ideally, the user or users can drive their vehicle in a legal fashion after a night of rest without even exiting the vehicle. After a night of rest, the occupants may partially unassemble panels and associated support elements, perhaps such as by moving the disassembled panels to the rear, or folding them (or some of them) out of the way along with the frame (where they are foldable), putting the headrests into their normal position, and elevating the seats to a driving position; this can all be performed without exiting the vehicle, in certain embodiments.

Setting up supports in order to assemble the frame can be accomplished for some embodiments as follows. There may be six hooks and strap members (e.g., vehicle-contacting, above-platform, non-horizontal supports) and two cylinder-like supporting points (vehicle-contacting, under-platform, non-horizontal support) that support the horizontal frame. These may contact the frame at non-horizontal support frame contact sites, for some embodiments such as shown in FIG. 3 (14-21). Three of the straps may be hung on the head rests supports of the back seats (FIG. 3, (14, 15, 16)). The other two may be hung on the access handles of both sides of the automobile in the middle (FIG. 3, (17 and 18)). The last one may be hung on the handle of the front passenger side (19). Such connections may be achieved, at least in part, by strap hooks 8-13. These may generally be strap connection sites (on the frame); post contact sites may be 20 and 21 (there may also be, particularly in embodiments where the vehicle does not have an access assist handle for the driver, a post contact site on the left side of the driver seat (perhaps a bit forward thereof). However, instead of a hook or other component on the frame that facilitates strap connection to the frame, in some embodiments there may be no such component, as straps may simply wrap around any horizontal support of the frame.

Figure 5:
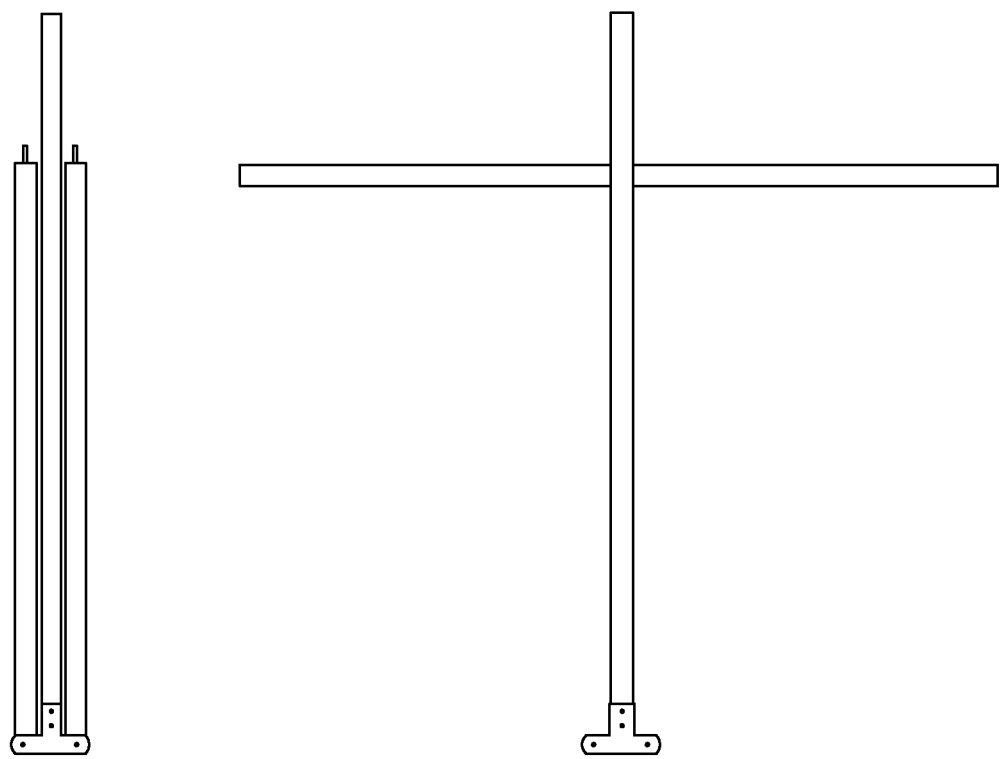
FIG. 5 shows the middle section of the back-seat area folding frame members of an embodiment. The one on the left is the folded piece. The one on the right side is how this piece may look when it is unfolded.
Figure 6:
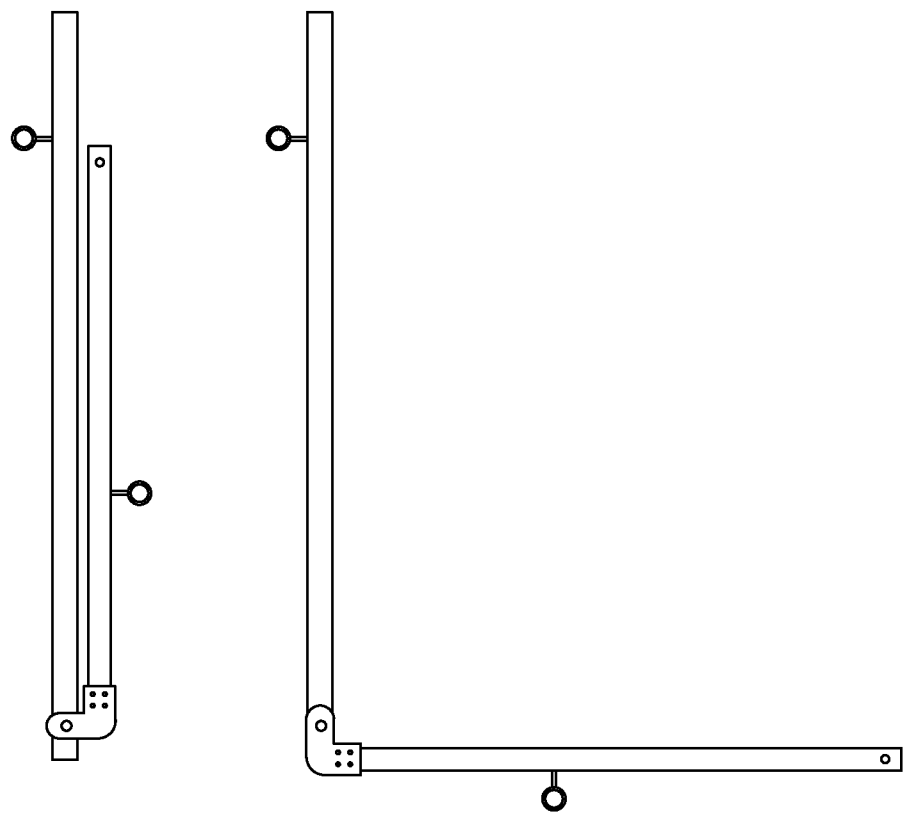
FIG. 6 shows the left piece of the back-seat area frame members of the above embodiment. The diagram on the left is a folded piece; the one on the right is unfolded piece.
Figure 7:
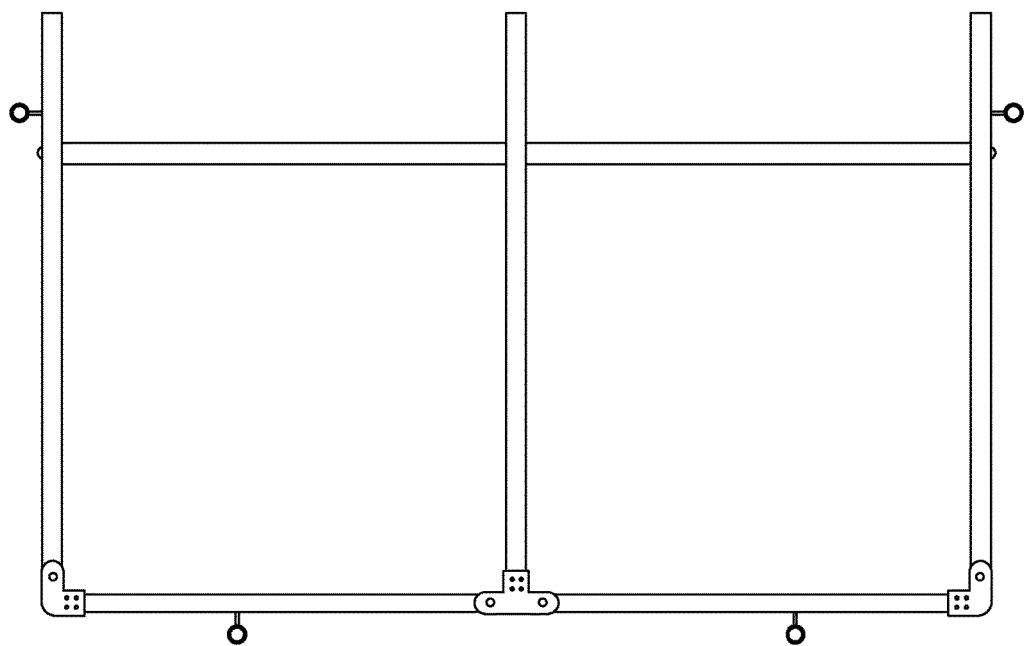
FIG. 7 shows the overall view of the back-seat area frame supports of an embodiment.
Figure 8:
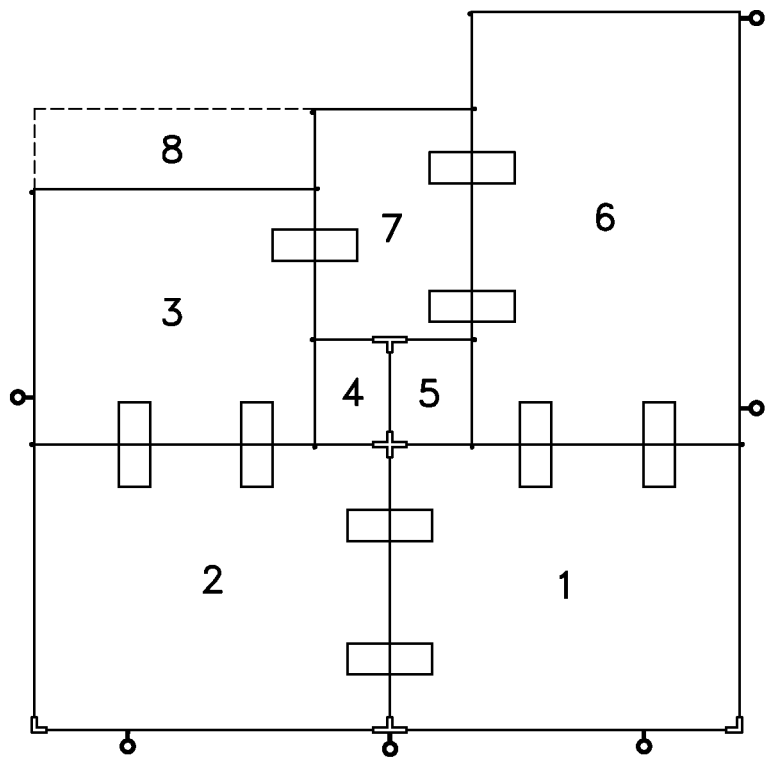
FIG. 8 shows a sleeping platform embodiment, in an embodiment of the inventive technology, highlighting rectangular Velcro connectors.
Figure 9:
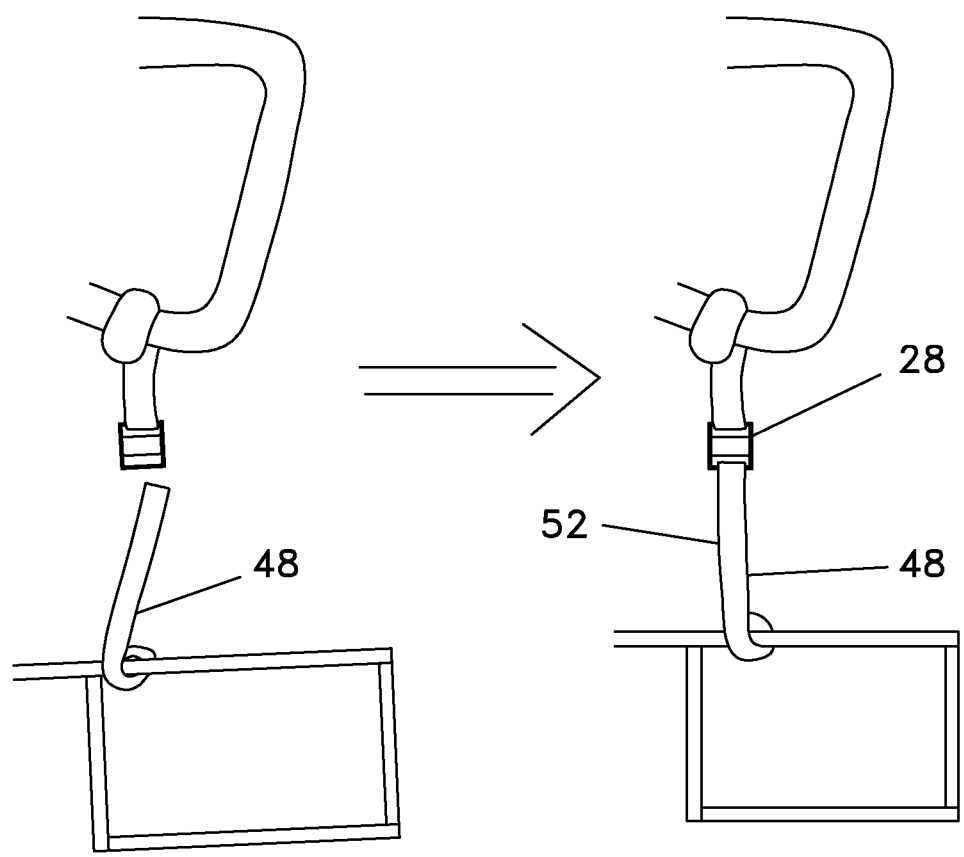
FIG. 9 shows an embodiment where the connecting support straps may strap onto an interior handle on one end, and the sleeper system's frame on the other end.
Figure 10:
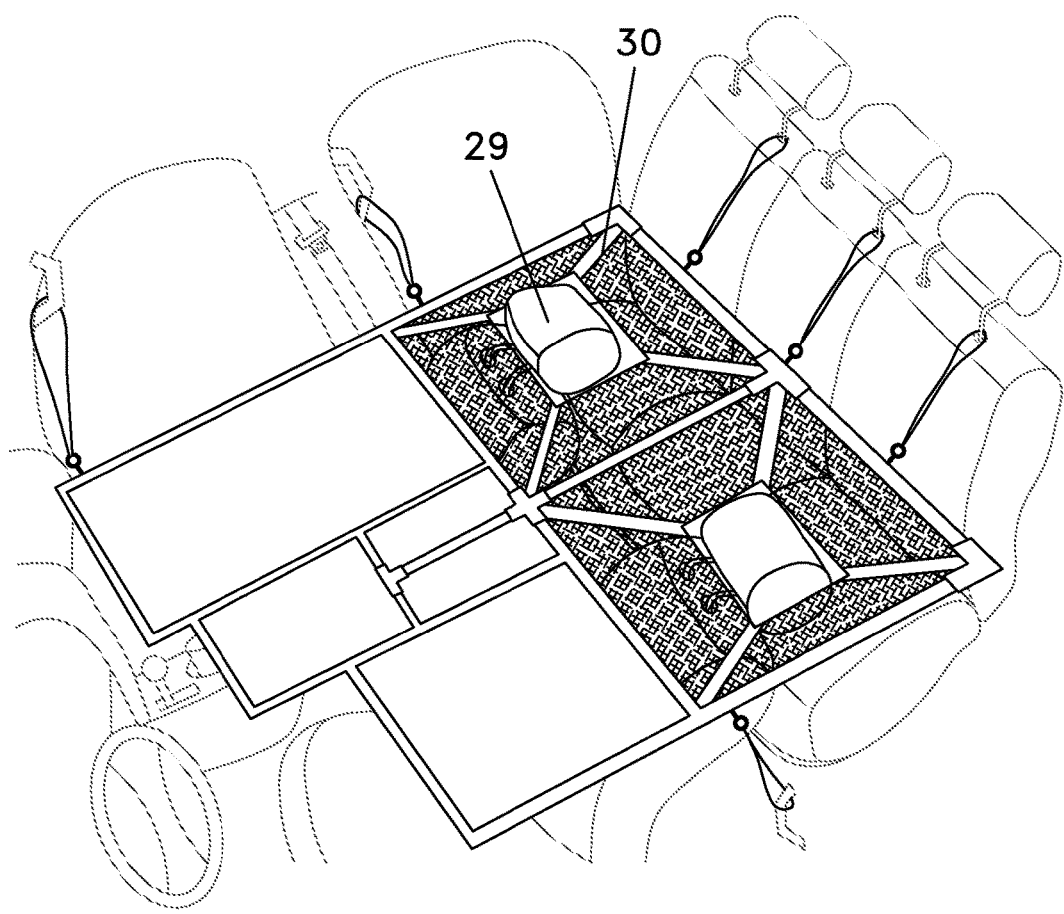
FIG. 10 shows a possible embodiment wherein panels may be substituted for mesh netting.
Figure 11:
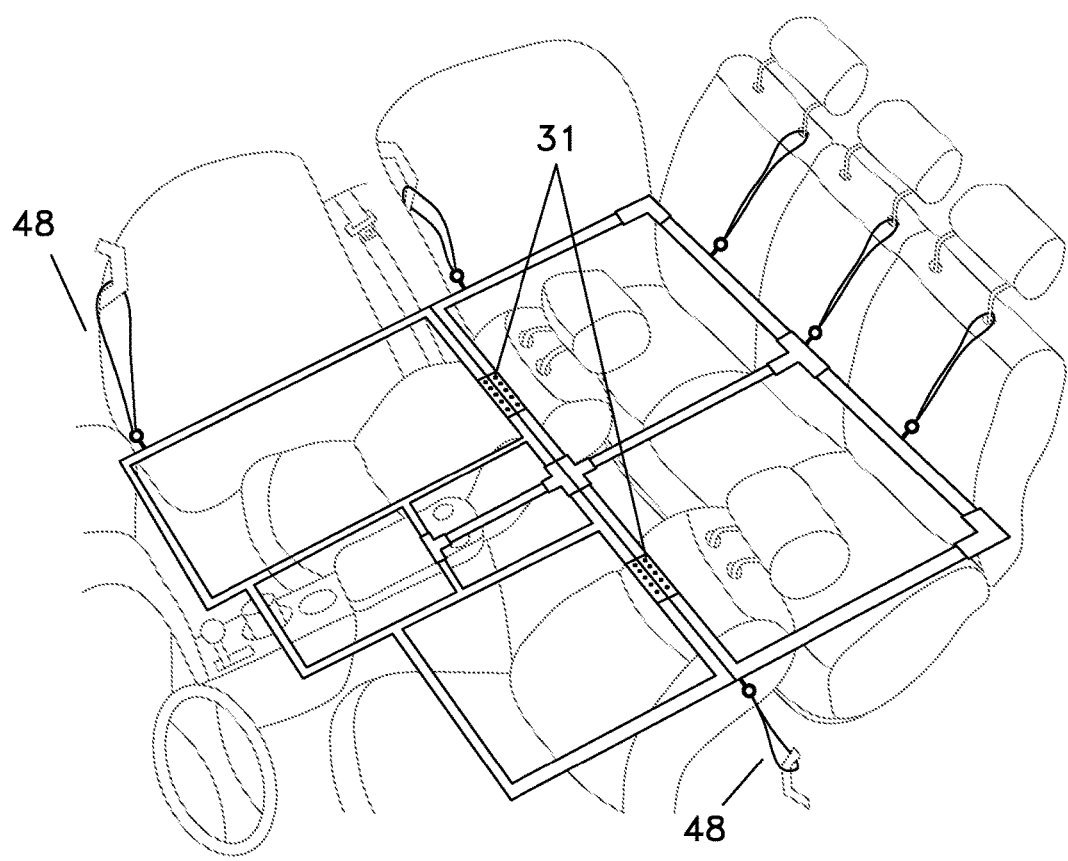
FIG. 11 shows an embodiment wherein a sleeping system is assembled showing two hinge points (31).
Figure 12:
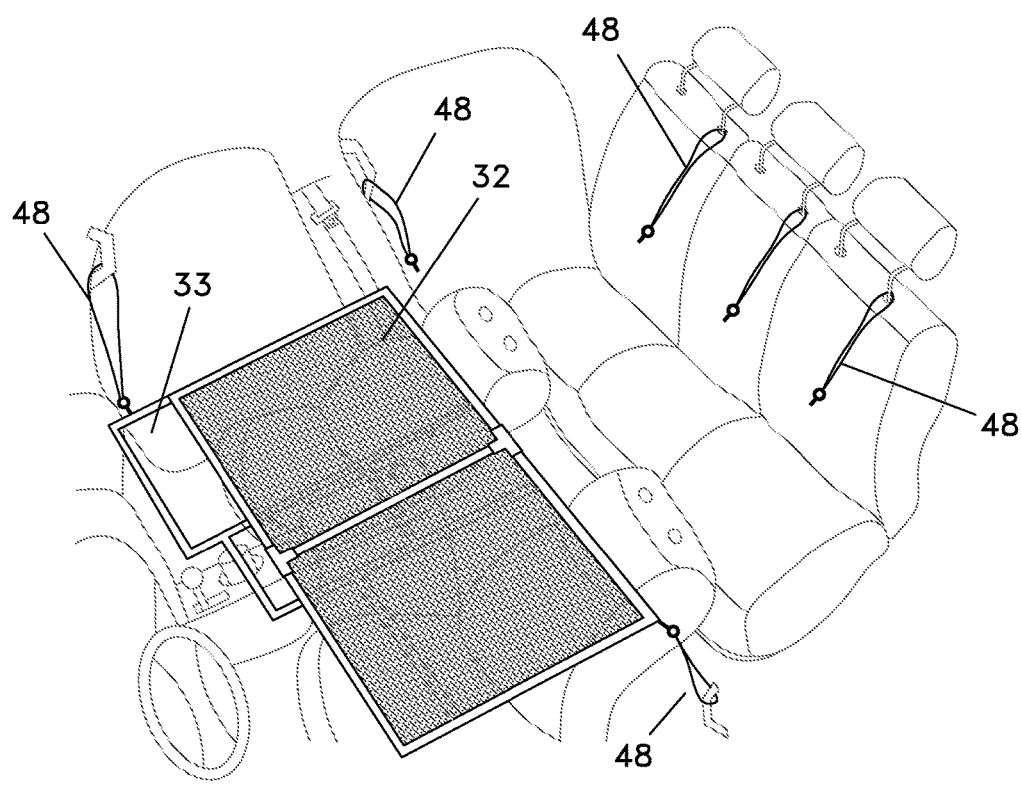
FIG. 12 shows an embodiment wherein the two sections that comprise the sleeping systems are folded on top of each other and rest atop the forward-most platform section. In this embodiment, the folded sections may allow for room to enter, exit or be easily accessed, along with additional headroom.
Figure 13:
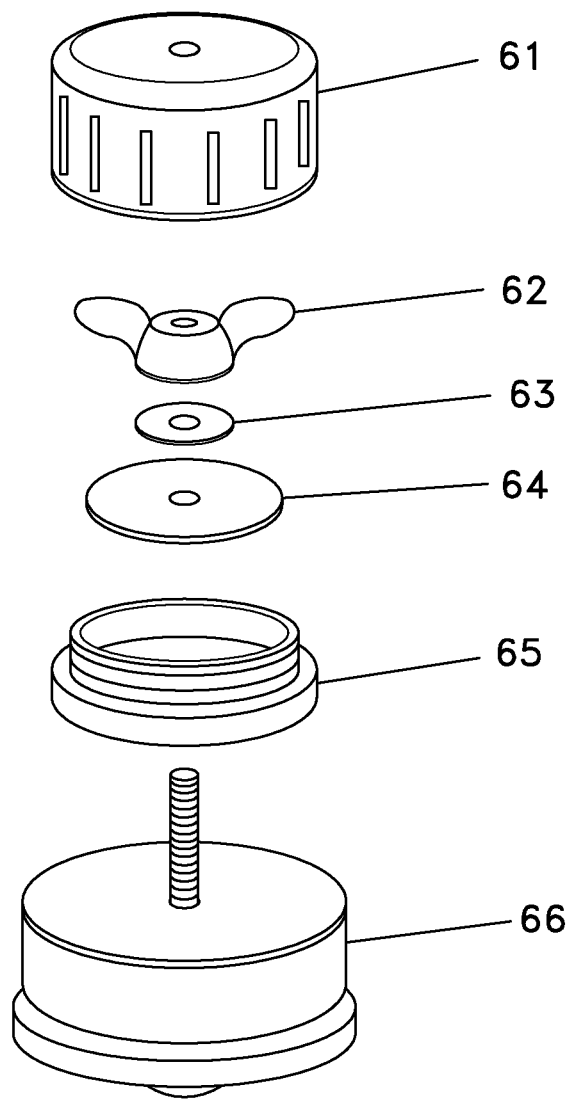
FIG. 13 shows all the pieces mentioned herein of an adjustable cup-holder device, in an embodiment of the inventive technology. Components of the device of FIG. 13 include: internal thread top cap (61); wing nut (62); nylon washer (63); washer (64); external threaded coupling (65); and plumbing test plug at the lower end (66).
Figure 14:
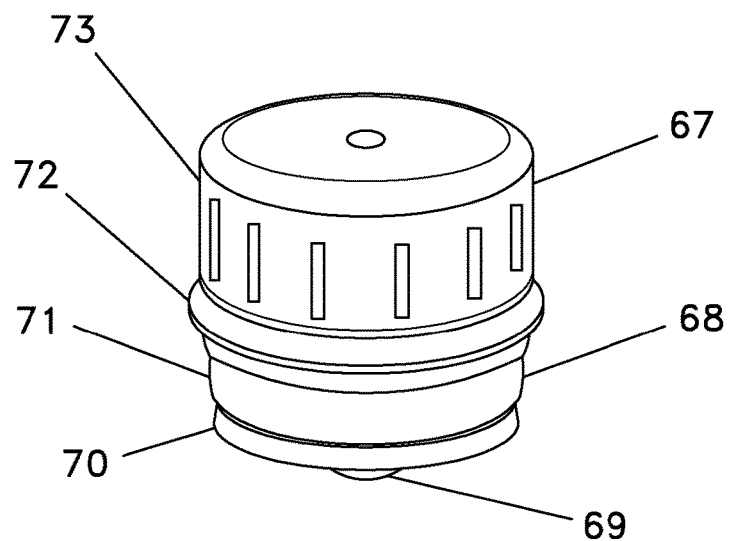
FIG. 14 shows an embodiment of an adjustable cup-holder device assembled, in an embodiment of the inventive technology. Components of the device of FIG. 14 include: a screw on cap (73) at upper end (67), and at lower end (68): top conical shaped washer (72); internal beveled rubber element (71); and bottom conical shaped washer (70).
Figure 15:
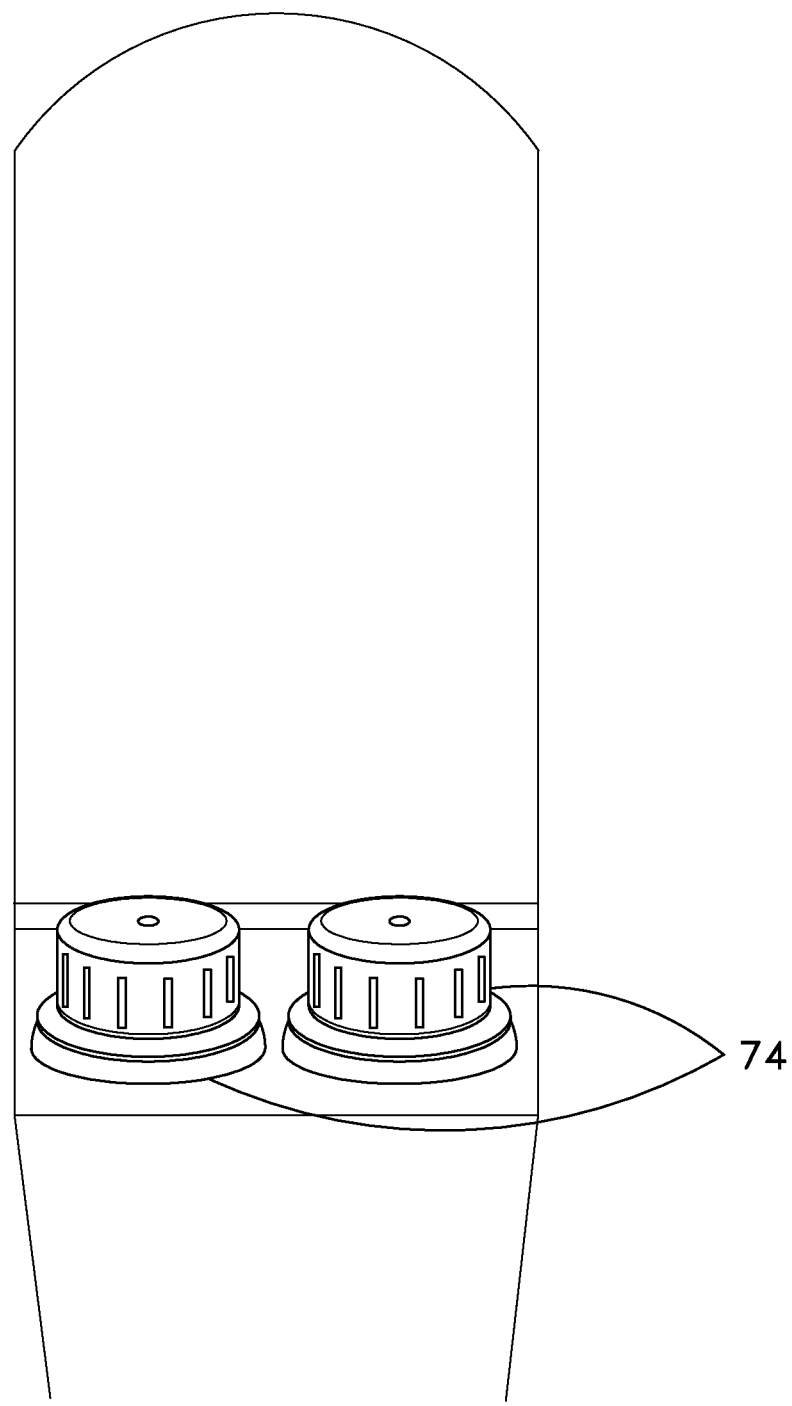
FIG. 15 shows an embodiment wherein two adjustable cup-holder devices are placed in cup-holders, in an embodiment of the inventive technology.
Figure 16:
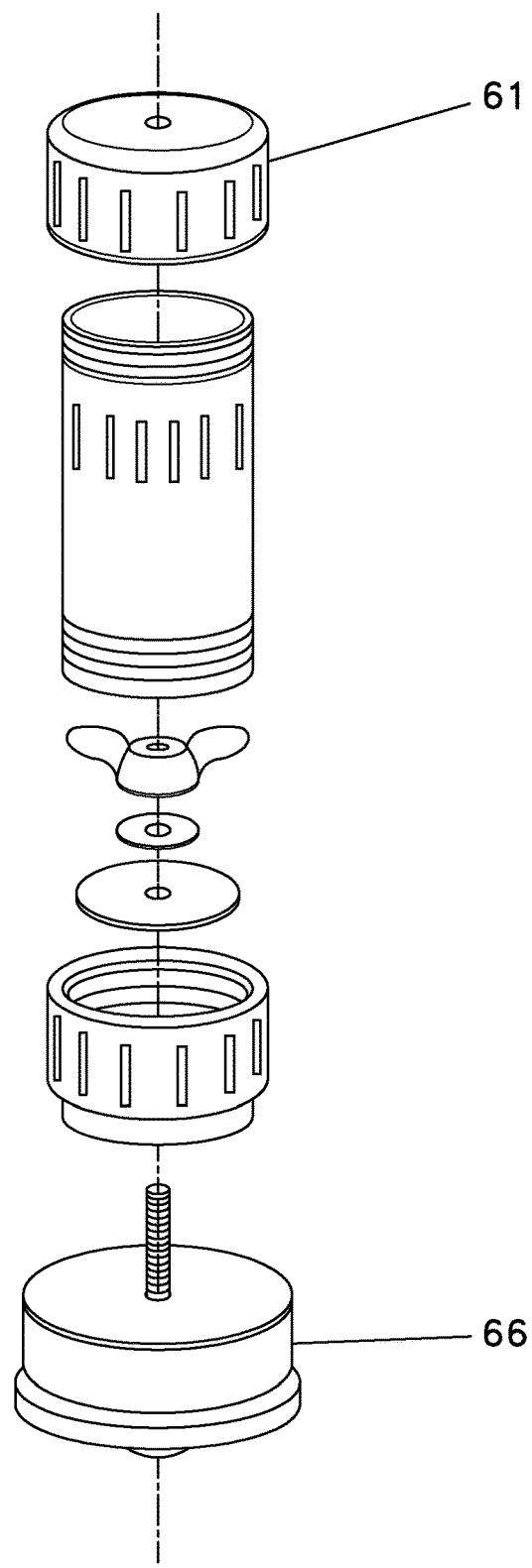
FIG. 16 shows a front view of pieces mentioned herein for an adjustable cup-holder device, in an embodiment of the inventive technology.
Figure 17:
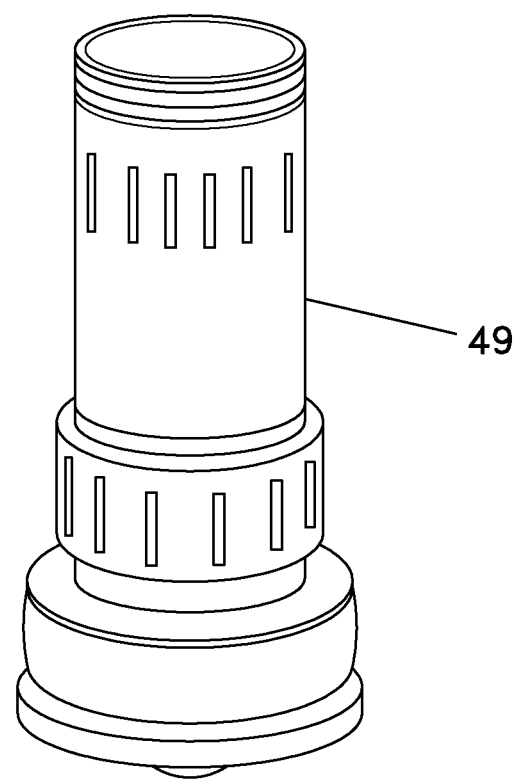
FIG. 17 is a front view of an assembled adjustable cup-holder support device, in an embodiment of the inventive technology.
Figure 18:
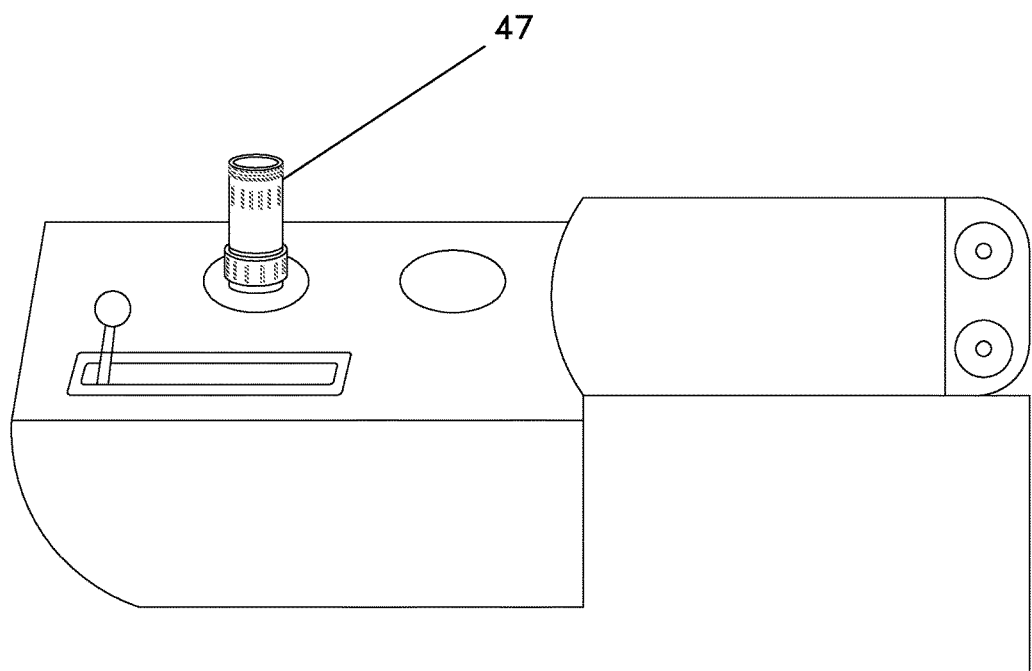
FIG. 18 is a side view of an assembled front cup-holder support device, in an embodiment of the inventive technology.
Figure 19:
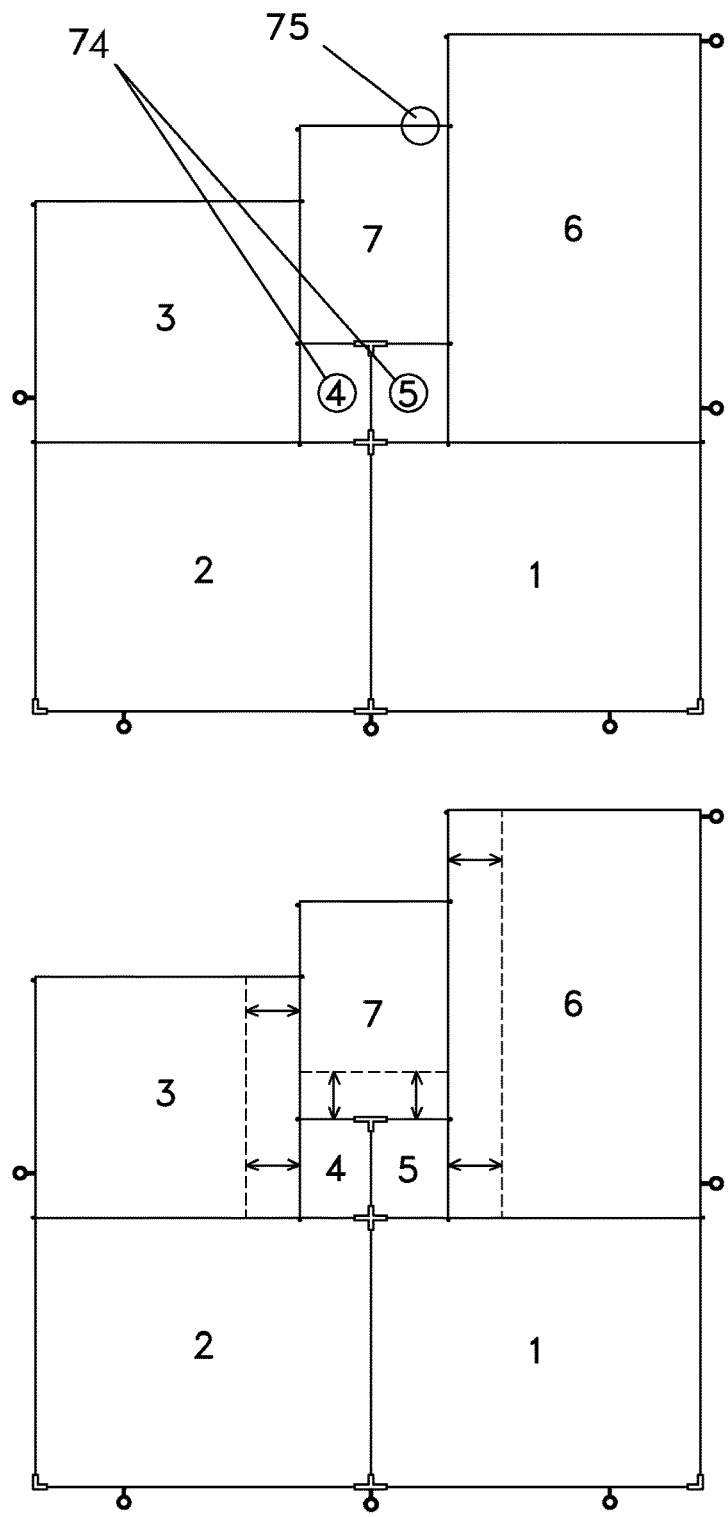
FIG. 19 shows an overall view of one embodiment of the sleeping system, highlighting the cup-holder support devices, in an embodiment of the inventive technology.
Figure 20:
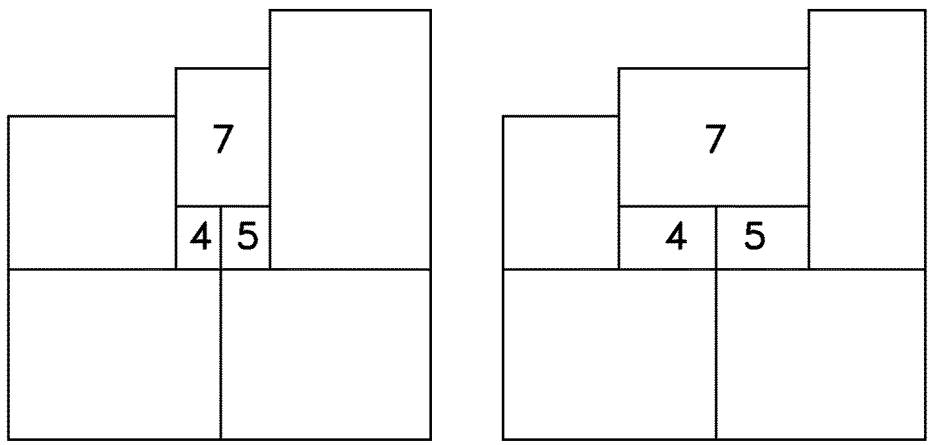
FIG. 20 shows an overall view of four additional embodiments of the sleeper system, in an embodiment of the inventive technology.
Figure 20:
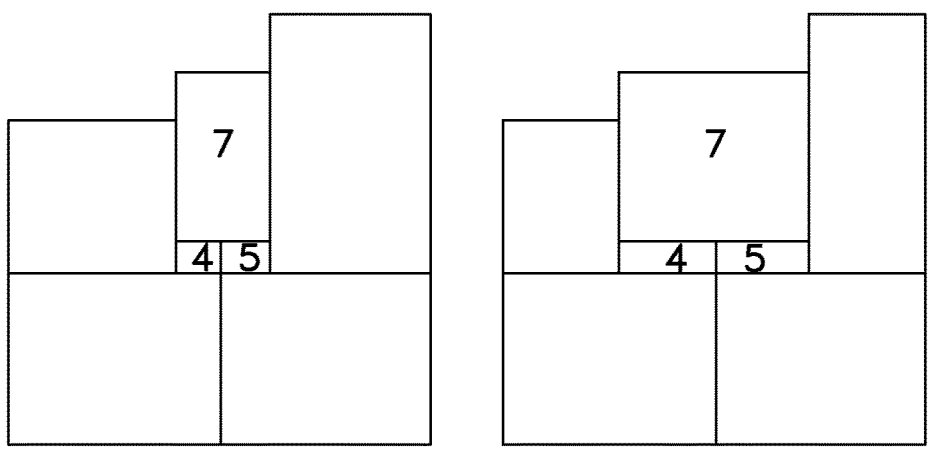
Figure 21:
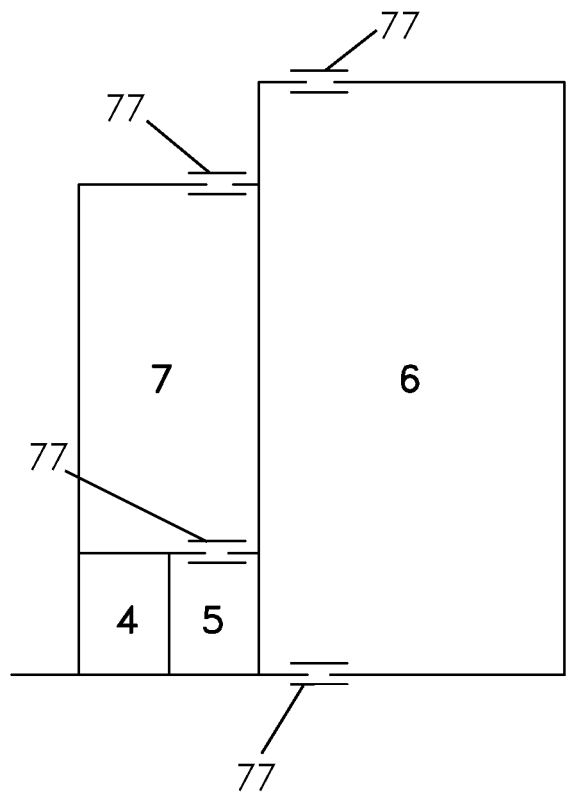
FIG. 21 shows a possible embodiment with adjustable square tubing, in an embodiment of the inventive technology.
Figure 21:
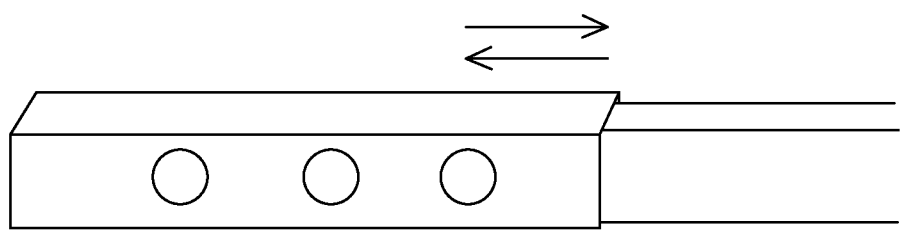
Figure 22:
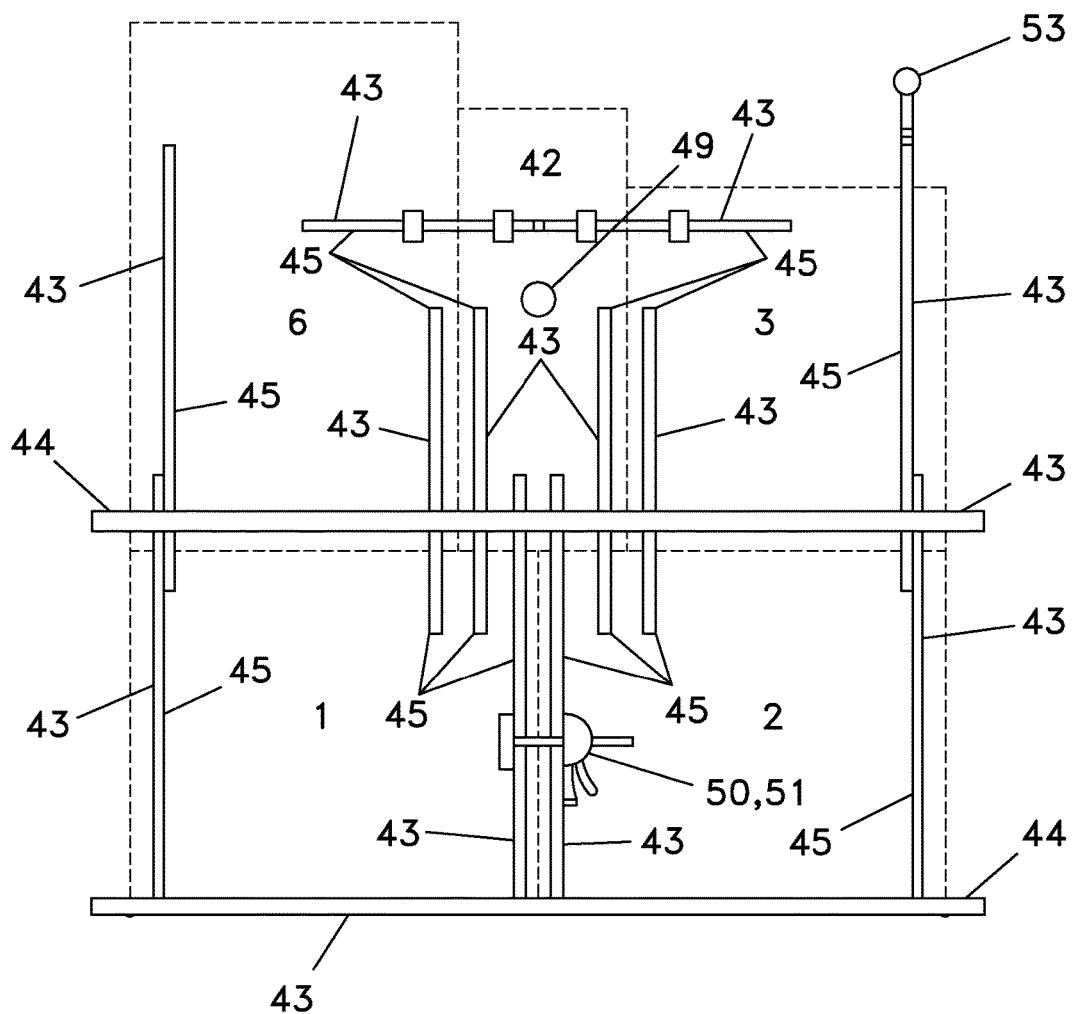
FIG. 22 shows a view, from below, of a platform system, in an embodiment of the inventive technology, as installed. Panel edges are shown in dashed line for clarity (and panels are transparent so the supports below can be shown). Other than the dashed lines.

In certain embodiments, the two vehicle contacting, under-platform, non-horizontal supports may be used for providing more support to the edges of the sleeping system from bottom, as shown in the FIG. 3 (20-21). For some embodiments, connecting the supports (the pieces of the frame and the non-horizontal supports) together and being ready for setting up the platform can be accomplished as follows: The frame and non-horizontal supports of this embodiment of the sleeping system may function as the frame of a normal bed, which provides support to the whole sleeper body. On the surface of certain supports (some of which may be square aluminum tubing), Velcro™ might be placed, to help secure the carpet wrapped platform. The specific functions of the Velcro™ are illustrated in the platform part below, which is section 4-b. The entire frame can be divided into two sections for some embodiments: the front section (FIG. 2, (below panels 3-7)) and the back section (FIG. 2, (below panels 1-2)). The material of aluminum alloy may be selected as the framing material. However, using other materials or other sizes of aluminum tubes is possible. In such embodiments, the aluminum alloy tubes might be connected with hinges, or some other device which can be used to make horizontal support connections easier and faster for the users. However, such feature is not required. For the full size of the multi-person adjustable platform sleeping system, as shown in FIG. 1, the user or users may need to set up the rear portion of the frame first. For example, FIG. 5, depicts a situation where a user might need to unfold or connect horizontal supports such as the middle back piece, and then connect the left back piece (FIG. 6) and the right back piece (FIG. 7) with the middle back piece together (all of which are horizontal supports) as shown in FIG. 8. The entire process can be done inside of the automobile. After that, the user can hook up the back frame with the hanging members (vehicle contacting, non-horizontal supports) that may be located on the backseats and the two handles of the two sides in the middle of the automobile via the contact sites, as shown in FIG. 3, (14-18). For the front section of the frame, the user can use the same way to connect the tubes first, and then hook the front section up through the rest of the hanging points with the last hanging member, as shown in the FIG. 3, (19). In such embodiments, the front section of the frame may alternatively be pulled out with a sliding motion such as railing and wheel assembling by the use of telescoping tubing. Any support (member, part, or section of the frame (or sleeping platform)) may be unfolded, telescoped, placed beneath, placed above, or rotated out of the way.

Figure 2:
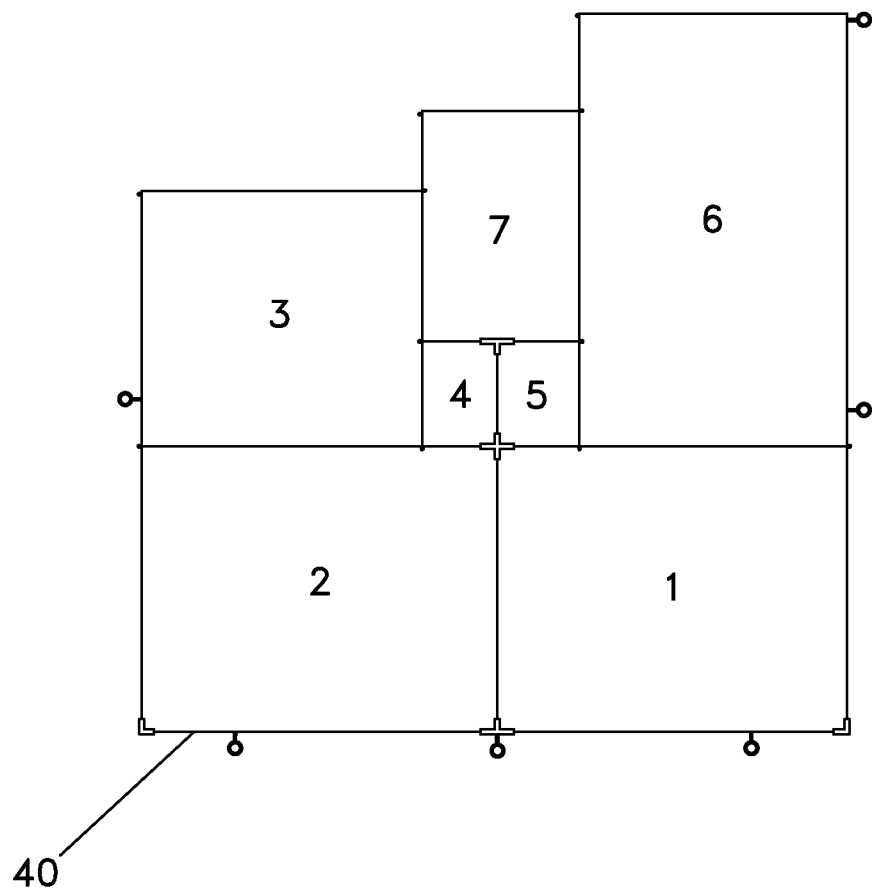
FIG. 2 shows the overall view of an aluminum support frame embodiment containing hinged or pivoting connections to allow for foldability, in an embodiment of the inventive technology. Foldability may allow for quicker frame assembly or installation. Also seen are rings for attaching straps or strap-hooks in places where suspended support occurs.

For a single-person version of the present invention, the user may only need to set up or use only part of the full version. As shown in FIG. 2, the single person version may only need areas 1, 5, 6 in the picture (or, instead, 1, 6 and a single panel, such as a console area panel, that takes the place of the three panels 4, 5 and 7). Or just panels 1 and 6 could be used. Note that any of the previous could have panel 2 added to them to increase size. Due to the flexibility of the present invention, this sleeping device may allow users to adjust the sleeping space as they wish. It can also be sold in a component fashion. For example, if the space of area 1 and area 2 in FIG. 2 is enough for the user, he or she may only set up or even buy his or her own single version sleeping system. In this way the user may have space for a passenger, or may place his or her pet on the passenger side.

Figure 4:
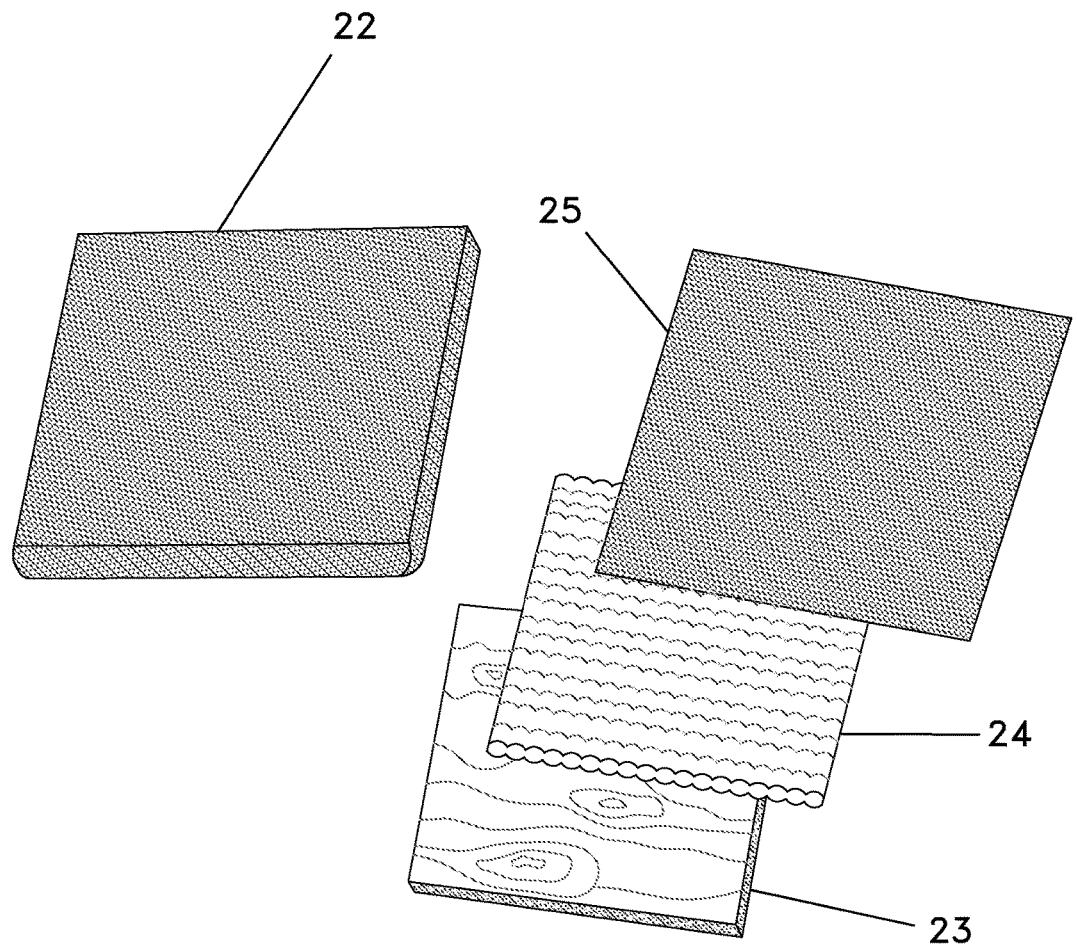
FIG. 4 shows a sample panel (2), in an embodiment of the inventive technology, which in this embodiment includes three layers: wood board (23), foam (24), and carpet (25).

Placing the panels on the top of the installed frame can be accomplished as follows. For some embodiments, the platform of the present invention may be comprised of multiple panels, as shown, e.g., in FIG. 1 (1-7), which may allow users to adjust the size of their own sleeping space according to the size and type of their vehicle. In certain embodiments, each panel may have several layers, as shown in FIG. 4, (22): a wood or other appropriate board or surface (23), which may function as a spring box of a real bed and can provide enough support, spring effect (bounce), and can provide a flat and firm sleeping surface; and a piece of foam (24) may function as the mattress of a normal bed. This piece of foam or other yieldable material or item may play a significant role to the platform. It may provide a comfortable and soft sleeping surface, and thermal insulation for the sleeper. An additional layer may be a piece of carpet (25), which may be used not only to wrap the board and the foam together, but may also provide a rougher surface to connect with the Velcro which may be placed on the frame, in order to secure and stabilize every element of the wrapped board or surface. At the same time the carpet can provide a softer, comfortable and vaccumable sleeping surface for users to sleep on and clean. In certain embodiments, the panels are made of plastic; foam may overlay upper surface of the panels (whether plastic or not). In certain embodiments, below the lower layer of the panels may be panel-attached horizontal supports; they may be attached thereto (perhaps slidingly), with brackets. Again, some (or all) (or none) of such supports may be slidable relative to the panel with which they are attached.

In some embodiments, each wrapped piece of the panels (excluding any panel attached horizontal supports) may have two sides, the top side and the bottom side. The top side may have three layers, as mentioned above. However, the bottom side of the panel (excluding any panel-attached horizontal supports) may only have two layers: perhaps such as the wood board and the carpet. Because it is lacking the foam piece, the surface of the bottom side may be hard, which is able to provide users with a harder and firmer surface; where the front side may be soft and plushy due to the foam's cushion-like material. If the users place the platform upside down, they can use the platform as a table or shelf to place their belongings when they are traveling.

Some embodiments can be configured so that the users can set up the sleeping system based on their preferences. For the full size version, perhaps users will desire to use all of the pieces, as shown in FIG. 1 (1-7), a single user, the user might set up pieces 1 and 2, or 1, 5 and 6. Consider that users might need something from the central console storage compartment, which is the area in FIG. 1 (4, 5, and 7) after they set up the sleeping system. Therefore, a lifting member, such as a rope ring might be placed on the sides of these pieces in some embodiments. In this way, the user can lift these pieces easily to access the storage compartment below. This can be performed even though people are on the top of other sections of the platform. An advantage of this invention is the storage space available beneath the platform system and the availability to store belongings in the bed of a pickup truck if used with that type of vehicle. Ely's exterior hammock teaches that the rear strap connects to the car's trunk storage area. In the supporting fashion, users cannot open the trunk or hatch to access travel belongings. The present invention allows access to all belongings. Any section of the platform can be raised, or removed, to access stored belongings or take advantage of additional storage area. Ely's hammock is not flexible and does not allow the user to access belongings stored below the hammock (atop the seat of floorboard area).

Side advantages of the multi-person adjustable platform sleeping system for automobile interiors are also evident for some embodiments. FIG. 1 depicts an embodiment that does not suspend above the totality of the driver's seat (because driver area panel 3 is shortened and does not extend all the way to the front of the steering wheel). The sleeping system only covers less than half of the driver's seat area. The users may have an easy and safe egress and ingress method via the driver's side front door. The driver's side seat area may become a good entry and exit point for occupants. In other words, when users enter their vehicle equipped with embodiments of the present invention, they may open the driver side door and sit on the front seat somewhat as normal, particularly where driver area panel is entirely removed); next the user simply lies back onto the present invention, or alternatively simply rolls onto the present invention, or may raise his or her rear-end about 6 inches and may slide their rear onto the platform and then lay down. Second, embodiments of this design can be for the user's safety concern. Keeping this area uncovered (i.e., where driver area panel 3 is entirely removed) may allow users enough space to quickly "jump" or "hop" into the driver seat and drive away immediately when they are threatened by such situations as wild animal attacks and/or a stranger's disturbance.

FIG. 3 depicts an embodiment with space between the frame and the floor of the vehicle. The users can use this space can be for storage to store their bags or other belongings. When they are sleeping inside the automobile, they can put their valuable belongings with them inside of the vehicle. Travelers who are concerned about theft may utilize the present invention because it may allow them to constantly remain with their belongings. Presently, travelers who utilize motels and hotels to achieve adequate rest may have to haul all of their belongings from their pickup truck or car into their hotel room after a long day of travelling; or they may risk their belongings being stolen and may not sleep well worrying about their vehicle and its belongings. Users of the present invention may have the flexibility to achieve an adequate sleeping compartment any place and at any time, all while their belongings are safe with them.

The process of setting up the multi-person adjustable platform sleeping system might only take 15 to 20 minutes. It may be easier, more comfortable, more convenient and safer than setting up and sleeping in a tent. Sleeping inside of the automobile may also protect the users from bad weather situations.

As can be easily understood from the foregoing, the basic concepts of the present invention may be embodied in a variety of ways. It involves both techniques as well as devices to accomplish the appropriate automobile sleeping system. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment (s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" or "means for supporting" should be understood to encompass disclosure of the act of "supporting"—whether explicitly discussed or not—and, conversely, were there effectively disclosure of the act of "supporting", such a disclosure should be understood to encompass disclosure of a "support" and even a "means for supporting" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional patent application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant (s).

Thus, the applicant(s) should be understood to have support to claim and make a statement of invention to at least: i) each of the sleeping system devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A disassemblable platform system in a vehicle interior, comprising:
   a plurality of panels relatively positioned to form a flat, raised rigid platform in a vehicle interior, the platform being elevated above lower seat cushions in the vehicle interior, said plurality of panels comprising at least one rear panel, a driver area panel, and a passenger area panel;
   horizontal supports that underlie at least two of said plurality of panels, said horizontal supports comprising:
   at least one right-to-left horizontal support bar; and
   panel-attached horizontal supports that are each attached to a corresponding panel to which they are dedicated;
   wherein said panel-attached horizontal supports extend horizontally beyond corresponding panel to which they are attached so as to underlie at least one adjacent panel;
   vehicle contacting, non-horizontal supports that directly contact at least some of said horizontal supports and provide support to said platform, wherein said non-horizontal supports comprise:
   at least one platform support that supports said platform from below said platform by vehicle contacting; and
   a plurality of vehicle contacting, above-platform, non-horizontal supports, wherein at least one of said vehicle contacting, above-platform, non-horizontal supports are connected to at least one of: a vehicle-occupant assist handle, and a hole exposed by a removed front seat headrest; and
   at least one rear seat headrest configured vehicle contacting, above-platform, non-horizontal support; and
   at least one inter-panel compression device operable to bring one panel of the plurality of panels toward another in a horizontal plane, the compression device being selected from the group consisting of: a clamp; telescoping, lockable, panel-attached horizontal supports; and a tension-resistant strap.

2. The disassemblable platform system as described in claim 1 wherein said plurality of vehicle contacting, above-platform, non-horizontal supports comprise at least one adjustable strap.

3. The disassemblable platform system as described in claim 1 wherein said platform, when installed, is elevated also above front seats in the vehicle interior when the front seats are reclined.

4. The disassemblable platform system as described in claim 1 wherein at least some of said panel attached supports are slidingly attached with the corresponding panel to which they are dedicated.

5. The disassemblable platform system as described in claim 1 wherein said driver area panel, and said passenger area panel can be removed from the rear panels.

6. The disassemblable platform system as described in claim 1 wherein at least one rear seat headrest configured vehicle-contacting, above-platform, non-horizontal support is configured as a hook and strap member.

7. The disassemblable platform system as described in claim 6 wherein said at least one rear seat headrest configured vehicle-contacting, above-platform, non-horizontal support configured as a hook and strap member comprises at least one rear seat headrest configured vehicle-contacting, above-platform, non-horizontal support configured as a hook, a length adjustable strap, and a strap adjustment member.

8. The disassemblable platform system as described in claim 1 wherein said plurality of vehicle contacting, non-horizontal supports are configured as supports connected at one end to a steering wheel.

9. The disassemblable platform system as described in claim 1 wherein at least one of each said horizontal supports, said vehicle contacting non-horizontal supports, and said at least one rear seat headrest configured vehicle-contacting, above-platform, non-horizontal support is length adjustable.

10. The disassemblable platform system as described in claim 1 wherein plastic, rubber or foam sleeves surround at least two of said horizontal supports.

11. The disassemblable platform system as described in claim 1 wherein said panel-attached horizontal supports are extendable.

12. An apparatus assemblable into a flat, raised, rigid platform that occupies at least part of a horizontal plane in an interior of a vehicle, comprising:
  a plurality of panels configured to be arranged in a pickup truck cab, the plurality of panels being arranged in an installation mode to form said flat, raised, rigid platform in said vehicle interior to be elevated above lower seat cushions in the vehicle,
  said panels comprising two rear panels configured to be established in a rear seat area of said vehicle, a driver area panel configured to be established in a driver area of said vehicle, a passenger area panel configured to be established in a passenger area of said vehicle, and a console area panel configured to be established in a console area of said vehicle, the console area panel located between said driver area and said passenger area panels;
  horizontal supports configured to underlie or form the bottom part of at least two of said plurality of panels in said installation mode, said horizontal supports comprising:
  at least two right-to-left horizontal support bars configured to be established in a right-to-left direction and panel-attached horizontal supports, each panel-attached horizontal support is attached to a corresponding panel to which it is dedicated;
  wherein said panel-attached supports are configured to extend, or are permanently extended, horizontally beyond the corresponding panel to which they are attached so as to underlie at least one adjacent panel in said installation mode;
  vehicle contacting, non-horizontal supports configured to directly contact at least some of said horizontal supports in said installation mode, and thereby provide support to said platform, wherein said non-horizontal supports comprise:
  at least one platform support that supports said platform from below said platform by contacting a surface of said vehicle below said plurality of panels in said installation mode, and
  a plurality of above-platform, non-horizontal supports configured to contact a component of said vehicle above said platform in said installation mode, wherein at least some of said vehicle contacting, non-horizontal supports are configured to connect to one of: a vehicle-occupant assist handle, and a hole exposed by a removed front seat headrest, at least one rear seat headrest configured vehicle contacting, above-platform, non-horizontal support; and
  at least one inter-panel compression device configured to keep one panel securely against another in a horizontal plane in said installation mode, said device selected from the group consisting of: a clamp; telescoping, lockable, panel-attached horizontal supports; and a tension strong strap.

13. The apparatus assemblable into a flat, raised, rigid platform as described in claim 12 wherein said at least one rear seat headrest configured vehicle contacting, above-platform, non-horizontal support is configured as a hook and strap member.

14. The apparatus assemblable into a flat, raised, rigid platform as described in claim 13 wherein said at least one rear seat headrest configured vehicle contacting, above-platform, non-horizontal support configured as a hook and strap member comprises:
  at least one rear seat headrest hook vehicle contacting, above-platform, non-horizontal support;
  at least one rear seat headrest strap vehicle contacting, above-platform, non-horizontal support responsive to said at least one rear seat headrest hook vehicle contacting, above-platform, non-horizontal support; and
  at least one rear seat headrest adjustment member vehicle contacting, above-platform, non-horizontal support responsive to said at least one rear seat headrest strap vehicle contacting, above-platform, non-horizontal support.

15. The apparatus assemblable into a flat, raised, rigid platform as described in claim 14 wherein said at least one rear seat headrest hook vehicle contacting, above-platform, non-horizontal support comprises at least one rear seat headrest coated hook vehicle contacting, above-platform, non-horizontal support.

16. The apparatus assemblable into a flat, raised, rigid platform as described in claim 12 wherein at least one of said vehicle contacting, non-horizontal supports is configured as a support situated in a hole exposed from a removed front seat headrest.

17. The apparatus assemblable into a flat, raised, rigid platform as described in claim 12 wherein at least one of said vehicle contacting, non-horizontal supports is configured as a support connected at one end to a steering wheel.

18. The apparatus assemblable into a flat, raised, rigid platform as described in claim 12 wherein said flat, raised, rigid platform is elevated also above front seats when they are reclined.

19. The apparatus assemblable into a flat, raised, rigid platform as described in claim 12 wherein at least some of said horizontal supports have plastic, rubber or foam sleeves around at least part of said support.

20. The apparatus assemblable into a flat, raised, rigid platform as described in claim 12 wherein said at least one rear seat headrest configured vehicle contacting, above-platform, non-horizontal support is configured with rubber or foam sleeves around at least part of said support.

* * * * *